(12) United States Patent
Kawano et al.

(10) Patent No.: US 11,289,079 B2
(45) Date of Patent: Mar. 29, 2022

(54) INFORMATION PROCESSING APPARATUS AND INFORMATION PROCESSING METHOD

(71) Applicant: SONY CORPORATION, Tokyo (JP)

(72) Inventors: Shinichi Kawano, Tokyo (JP); Mari Saito, Kanagawa (JP); Hiro Iwase, Kanagawa (JP)

(73) Assignee: SONY CORPORATION, Tokyo (JP)

(*) Notice: Subject to any disclaimer, the term of this patent is extended or adjusted under 35 U.S.C. 154(b) by 141 days.

(21) Appl. No.: 16/489,810

(22) PCT Filed: Mar. 16, 2018

(86) PCT No.: PCT/JP2018/010379
§ 371 (c)(1),
(2) Date: Aug. 29, 2019

(87) PCT Pub. No.: WO2018/180571
PCT Pub. Date: Oct. 4, 2018

(65) Prior Publication Data
US 2020/0013402 A1    Jan. 9, 2020

(30) Foreign Application Priority Data
Mar. 30, 2017  (JP) .............................. JP2017-067652

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/012* (2013.01); *G06F 3/013* (2013.01); *G06F 3/017* (2013.01);
(Continued)

(58) Field of Classification Search
CPC ......... G06F 3/017; G06F 9/542; H04L 51/043
See application file for complete search history.

(56) References Cited

U.S. PATENT DOCUMENTS

| 8,698,621 B2* | 4/2014 | Velusamy .............. H04W 76/10 340/539.11 |
| 10,721,594 B2* | 7/2020 | Bose .................. G06Q 30/0272 |

(Continued)

FOREIGN PATENT DOCUMENTS

| EP | 2281667 A1 | 2/2011 |
| JP | 09-218770 A | 8/1997 |

(Continued)

OTHER PUBLICATIONS

International Search Report and Written Opinion of PCT Application No. PCT/JP2018/010379, dated Apr. 10, 2018, 08 pages of ISRWO.

(Continued)

*Primary Examiner* — Daniel Abebe
(74) *Attorney, Agent, or Firm* — Chip Law Group

(57) ABSTRACT

The present technology relates to an information processing apparatus and an information processing method for enabling a message to be more reliably conveyed to a user. Provided with a presentation unit that presents information to a first user, a detection unit that detects a reaction indicating that the first user has received the information, a search unit that searches for a second user in a case where the detection unit has not been able to detect the reaction, and a request unit that requests the second user found by the search unit to convey a message to the first user. A response promotion message asking for a response is output to the first user in the case where the detection unit has not been able to detect the reaction, and the search unit searches for the second user in the case where the detection unit has not (Continued)

been able to detect the reaction after the response promotion message has been output.

13 Claims, 27 Drawing Sheets

(51) Int. Cl.
*G06F 3/01* (2006.01)
*G06F 3/16* (2006.01)
*G10L 15/18* (2013.01)
*H04L 51/42* (2022.01)

(52) U.S. Cl.
CPC ............ *G06F 3/16* (2013.01); *G10L 15/1815* (2013.01); *G10L 2015/223* (2013.01); *H04L 51/22* (2013.01)

(56) References Cited

U.S. PATENT DOCUMENTS

| | | | | |
|---|---|---|---|---|
| 2006/0184351 | A1* | 8/2006 | Corston-Oliver | G06F 40/295 704/1 |
| 2006/0270425 | A1* | 11/2006 | Lee | H03M 7/30 455/466 |
| 2007/0192910 | A1 | 8/2007 | Vu et al. | |
| 2007/0288932 | A1* | 12/2007 | Horvitz | G06Q 10/107 719/313 |
| 2010/0287050 | A1* | 11/2010 | Jones | G06Q 30/02 705/14.58 |
| 2012/0203843 | A1* | 8/2012 | O'Sullivan | H04L 51/043 709/206 |

FOREIGN PATENT DOCUMENTS

| | | |
|---|---|---|
| JP | 2000-148607 A | 5/2000 |
| JP | 2002-251681 A | 9/2002 |
| JP | 2003-122992 A | 4/2003 |
| JP | 2004-220314 A | 8/2004 |
| JP | 2009-509673 A | 3/2009 |
| JP | 2012-073764 A | 4/2012 |
| JP | 2013-186797 A | 9/2013 |
| WO | 2007/041295 A2 | 4/2007 |
| WO | 2015/190562 A1 | 12/2015 |

OTHER PUBLICATIONS

Office Action for JP Patent Application No. 2019-509269, dated Dec. 28, 2021, 04 pages of English Translation and 04 pages of Office Action.

* cited by examiner

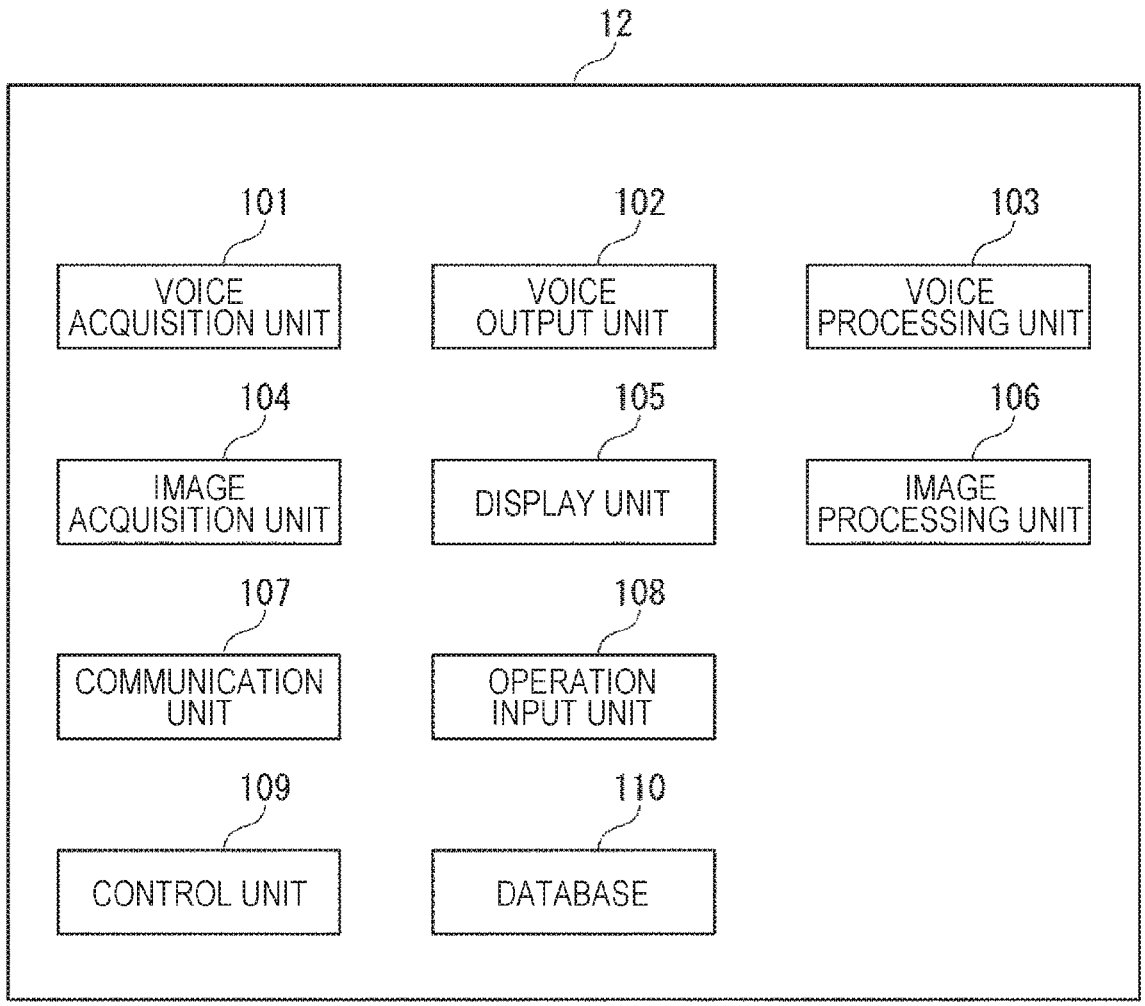

FIG. 7

| DETECTION INFORMATION | | | | | |
|---|---|---|---|---|---|
|  | MOTHER | CHILD | FATHER | NOISE SOURCE A | NOISE SOURCE B |
| OBJECT RECOGNITION INFORMATION | PERSON | PERSON | PERSON | BURNER | TELEVISION |
| POSITION DETECTION | Yes | Yes | No | Yes | Yes |
| EXISTENCE DIRECTION | SOUTH | SOUTH EAST | — | SOUTH | EAST |
| DISTANCE | 5m | 1m | — | 5m | 1m |
| FACE DETECTION | No | No | — | | |
| NOD DETECTION | No | No | — | | |
| HEAD DIRECTION | SOUTH | NORTH | — | | |
| VOLUME | 0 | 0 | — | HIGH | |
| VOICE RECOGNITION RESULT | None | None | — | | |
| SEMANTIC ANALYSIS RESULT | None | None | — | | |
| GAZE DETECTION | No | No | — | | |
| GESTURE DETECTION | No | No | — | | |

| OUTPUT CONTENT ID | VOICE OUTPUT INFORMATION | | | | |
|---|---|---|---|---|---|
| | OUTPUT CONTENT | NOTIFICATION DESTINATION | NOTIFICATION SOURCE | TIME | URGENCY |
| 1 | MOTHER'S FAVORITE SINGER A WILL APPEAR ON INTERNET TV PROGRAM PPP FROM 19:30 TODAY. | MOTHER | SYSTEM | 12:00 | normal |
| 2 | CONTACT SCHOOL IMMEDIATELY | MOTHER | SCHOOL | 12:15 | high |
| 3 | | | | | |

FIG. 9

| VOICE OUTPUT TRIAL RESULT INFORMATION 110d ||||
|---|---|---|---|
| OUTPUT CONTENT ID | NUMBER OF ACHIEVED OUTPUT TRIALS | OUTPUT TRIAL TIME | TTS CONTROL |
| 1 | 5 | 10sec | Normal |
| 2 | 0 | NOT YET | HIGH PITCH, TIME SHORTENED |
| 3 | | | |

CONVEYANCE CONFIRMATION UTTERANCE GENERATION TEMPLATE TABLE

| | TEMPLATE ID | TEMPLATE |
|---|---|---|
| FOR MOTION RESPONSE PROMOTION | M-1-1 | (name info), PLEASE RAISE YOUR HAND IN CASE WHERE YOU CAN IMMEDIATELY RESPOND TO (system info) |
| | M-1-2 | (name info), PLEASE RAISE YOUR HAND IN CASE WHERE YOU CANNOT IMMEDIATELY RESPOND TO (system info) |
| | M-2-1 | (name info), PLEASE TURN THIS WAY IN CASE WHERE YOU CAN IMMEDIATELY RESPOND TO (system info) |
| | M-2-2 | (name info), PLEASE TURN THIS WAY IN CASE WHERE YOU CANNOT IMMEDIATELY RESPOND TO (system info) |
| | M-3-1 | (name info), PLEASE NOD IN CASE WHERE YOU CAN IMMEDIATELY RESPOND TO (system info) |
| | M-3-2 | (name info), PLEASE NOD IN CASE WHERE YOU CANNOT IMMEDIATELY RESPOND TO (system info) |
| ... | ... | ... |
| FOR UTTERANCE RESPONSE PROMOTION | V-1-1 | (name info), CAN YOU OR CAN'T YOU RESPOND TO MESSAGE OF (output info)? |
| | V-2-1 | (name info), ARE YOU BUSY OR NOT? |
| ... | ... | ... |

DETERMINATION TABLE OF RESPONSE TO CONVEYANCE CONFIRMATION UTTERANCE

| | TEMPLATE ID | RESPONSE EXPECTATION | POSSIBILITY OF CONTINUATION |
|---|---|---|---|
| FOR MOTION RESPONSE PROMOTION | M-i-1 | DETECT ARM HAS BEEN RAISED HIGHER THAN HEAD IN GESTURE DETECTION | POSSIBLE |
| | | FACE DETECTION BECOMES Yes AND VOICE RECOGNITION RESULT IS "OK", "WHAT" | POSSIBLE |
| | | VOICE RECOGNITION RESULT IS "OK", "WHAT", "YES", "WHAT'S UP", "WHAT'S GOING ON", ... | POSSIBLE |
| ... | ... | ... | |
| ... | ... | VOICE RECOGNITION RESULT IS "NO", "WAIT A MINUTE", "LATER PLEASE", OR "NOT NOW" | NOT POSSIBLE |
| ... | ... | ... | |

| MESSAGE CALL REQUEST GENERATION TEMPLATE TABLE ||
|---|---|
| | TEMPLATE OF MESSAGE CALL REQUEST |
| FOR INFANTS | (name info), PLEASE LISTEN |
| | (name info), CAN YOU COME HERE |
| | THERE IS SOMETHING TO ASK YOU TO CONVEY TO (target user) |
| ... | ... |
| FOR ADULTS | (name info), THERE IS MESSAGE FOR (target user) |
| ... | (name info), ARE YOU BUSY NOW OR NOT? |

| WORD CONVERSION SYNONYM TABLE |||
|---|---|---|
| | | SYNONYM |
| FOR INFANTS | IN CASE OF RESPONDABLE | CAN YOU ANSWER? |
| | IN CASE OF RESPONDABLE | CAN YOU COME? |
| | URGENT BUSINESS | LITTLE RUSH |
| | WOULD YOU CONVEY | CAN YOU CONVEY?, SAY THIS TO |
| | (NAME OF MOTHER) | MOTHER |
| ... | ... | ... |
| FOR ELDERLY PEOPLE | AxB | FEMALE IDLE GROUP |
| ... | | |
| FOR COMMON WORD | GRAMOPHONE | RECORD |
| | | |
| FOR INAPPROPRIATE WORD CONVERSION | DEAD | DECEASED |

| | MESSAGE TEMPLATE TABLE |
|---|---|
| | MESSAGE TEMPLATE |
| FOR NORMAL USE | THERE IS CONTACT FROM (sender user) TO (target user) AT (time info) AND (sender user) SAYS "(output info)". WOULD YOU CONVEY MESSAGE? |
| FOR ASKING FOR COMING IN FRONT OF SYSTEM | WOULD YOU NOTIFY (target user) THAT PLEASE COME HERE BECAUSE THERE IS URGENT BUSINESS |
| FOR CONFIRMATION IN ANOTHER DEVICE | WOULD YOU NOTIFY (target user) THAT EMAIL HAS BEEN SENT BECAUSE THERE IS URGENT BUSINESS |
| IN CASE OF URGENCY | WOULD YOU CONVEY "(output info)" BECAUSE OF URGENT MATTER |
| FOR FEEDBACK | WOULD YOU DIRECTLY CONTACT BECAUSE "(output info)" HAS NOT BEEN ABLE TO BE CONVEYED? |
| ...... | |

| THRESHOLD VALUE TABLE OF CHARACTER AMOUNT | | | | | | |
|---|---|---|---|---|---|---|
| | AGE 5 OR YOUNGER | AGE 12 OR YOUNGER | AGE 18 OR YOUNGER | AGE 40 OR YOUNGER | AGE 59 OR YOUNGER | AGE 60 OR OLDER |
| THRESHOLD VALUE OF CHARACTER AMOUNT SWITCHED TO OUTPUT FOR ASKING FOR COMING IN FRONT OF SYSTEM | 10 CHARACTERS | 15 CHARACTERS | 25 CHARACTERS | 20 CHARACTERS | 15 CHARACTERS | 10 CHARACTERS |

FIG. 19

| | 110b |
|---|---|
| | MOTHER |
| OBJECT RECOGNITION INFORMATION | PERSON |
| ... | ... |
| FACE DETECTION | No |
| NOD DETECTION | No |
| HEAD DIRECTION | WEST |
| VOLUME | 40 |
| VOICE RECOGNITION RESULT | YYY, TAKE BATH SOON |
| SEMANTIC ANALYSIS RESULT | COMMAND |
| GAZE DETECTION | No |
| GESTURE DETECTION | INTENSIVELY MOVE BACK AND FORTH |

FIG. 23

| | CHILD |
|---|---|
| OBJECT RECOGNITION INFORMATION | PERSON |
| ... | |
| FACE DETECTION | OK |
| NOD DETECTION | OK |
| HEAD DIRECTION | NORTH WEST |
| VOLUME | 80 |
| VOICE RECOGNITION RESULT | YES |
| SEMANTIC ANALYSIS RESULT | AGREE |
| GAZE DETECTION | Yes |
| GESTURE DETECTION | RAISE BOTH HANDS |

110b

| | MOTHER |
|---|---|
| OBJECT RECOGNITION INFORMATION | PERSON |
| POSITION DETECTION | Yes |
| EXISTENCE DIRECTION | SOUTH |
| DISTANCE | 0.3m |
| FACE DETECTION | Yes |
| NOD DETECTION | no |
| HEAD DIRECTION | NORTH |
| VOLUME | 40 |
| VOICE RECOGNITION RESULT | WHAT'S GOING ON |
| SEMANTIC ANALYSIS RESULT | QUESTION |
| GAZE DETECTION | Yes |
| GESTURE DETECTION | RAISE ARM |

|  | MOTHER |
| --- | --- |
| OBJECT RECOGNITION INFORMATION | PERSON |
| POSITION DETECTION | Yes |
| EXISTENCE DIRECTION | SOUTH |
| DISTANCE | 0.3m |
| FACE DETECTION | Yes |
| NOD DETECTION | no |
| HEAD DIRECTION | NORTH |
| VOLUME | 40 |
| VOICE RECOGNITION RESULT | REALLY THANK YOU |
| SEMANTIC ANALYSIS RESULT | APPRECIATION |
| GAZE DETECTION | Yes |
| GESTURE DETECTION | RAISE ARM |

…

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/010379 filed on Mar. 16, 2018, which claims priority benefit of Japanese Patent Application No. JP 2017-067652 filed in the Japan Patent Office on Mar. 30, 2017. Each of the above-referenced applications is hereby incorporated herein by reference in its entirety.

TECHNICAL FIELD

The present technology relates to an information processing apparatus, an information processing method, and a program, and relates to, for example, an information processing apparatus, an information processing method, and a program for enabling a message to be more reliably conveyed to a user whom the message is desired to be conveyed to.

BACKGROUND ART

For example, installation of a device called agent in home and provision of various types of information to a user has been proposed. When such a device is used, information needs to be appropriately provided to a user whom the information is desired to be provided to. Patent Document 1 proposes that a user whom information is desired to be conveyed to is detected by image recognition, and the information is conveyed when the user has been detected.

CITATION LIST

Patent Document

Patent Document 1: Japanese Patent Application Laid-Open No. 2003-208190

SUMMARY OF THE INVENTION

Problems to be Solved by the Invention

Even if the user whom information is to be conveyed is detected and the information is conveyed, whether or not the information has been conveyed to the user has not been confirmed on a system (agent) side. Therefore, the information may not have been conveyed to the user, and an action cannot be taken in such a case. Reliable provision of information to the user is desirable.

The present technology has been made in view of such a situation, and enables information to be more reliably conveyed to the user.

Solutions to Problems

An information processing apparatus according to one aspect of the present technology includes a presentation unit configured to present information to a first user, a detection unit configured to detect a reaction indicating that the first user has received the information, a search unit configured to search for a second user in a case where the detection unit has not been able to detect the reaction, and a request unit configured to request the second user found by the search unit to convey a message to the first user.

An information processing method according to one aspect of the present technology includes presenting information to a first user, detecting a reaction indicating that the first user has received the information, searching for a second user in a case of having not been able to detect the reaction, and requesting the found second user to convey a message to the first user.

A program according to one aspect of the present technology causes a computer to execute processing including the steps of presenting information to a first user, detecting a reaction indicating that the first user has received the information, searching for a second user in a case of having not been able to detect the reaction, and requesting the found second user to convey a message to the first user.

In an information processing apparatus, an information processing method, and a program according to one aspect of the present technology, information is presented to a first user, a reaction that the first user has received the information is detected, a second user is searched for in a case where the reaction has not been detected, and conveyance of a message to the first user is requested to the searched second user.

Note that the information processing apparatus may be an independent apparatus or may be internal blocks configuring one apparatus.

Furthermore, the program can be provided by being transmitted via a transmission medium or by being recorded on a recording medium.

Effects of the Invention

According to one aspect of the present technology, information can be more reliably conveyed to a user.

Note that the effects described here are not necessarily limited, and any of effects described in the present disclosure may be exhibited.

BRIEF DESCRIPTION OF DRAWINGS

FIG. 5 is a diagram for describing a configuration of an information processing unit.
FIG. 6 is a diagram illustrating a configuration of an example of a database.
FIG. 7 is a diagram illustrating a configuration of an example of a database.
FIG. 8 is a diagram illustrating a configuration of an example of a database.
FIG. 9 is a diagram illustrating a configuration of an example of a database.
FIG. 10 is a diagram illustrating a configuration of an example of a database.
FIG. 11 is a diagram illustrating a configuration of an example of a database.
FIG. 12 is a diagram illustrating a configuration of an example of a database.

FIG. 13 is a diagram illustrating a configuration of an example of a database.

FIG. 14 is a diagram illustrating a configuration of an example of a database.

FIG. 19 is a diagram for describing an update of a database.

FIG. 23 is a diagram for describing an update of a database.

MODE FOR CARRYING OUT THE INVENTION

Hereinafter, modes for implementing the present technology (hereinafter referred to as embodiments) will be described.

<Configuration Example of System>

Figure 1:
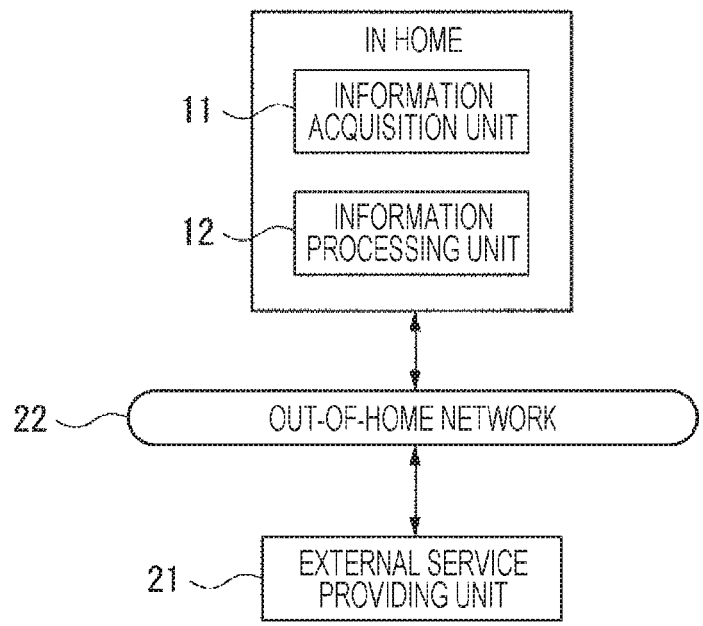
FIG. 1 is a diagram illustrating a configuration of an embodiment of an information processing system to which the present technology is applied.

FIG. 1 is a diagram illustrating a configuration of an embodiment of an information processing system to which the present technology is applied. The information processing system has a configuration including an information acquisition unit 11, an information processing unit 12, an external service providing unit 21, and an out-of-home network 22.

The information acquisition unit 11, the information processing unit 12, and the external service providing unit 21 are connected via the out-of-home network 22, and are configured to give and receive data to and from one another.

In the information processing system illustrated in FIG. 1, the information acquisition unit 11 and the information processing unit 12 are illustrated as devices installed in home. However, as in the information processing system illustrated in FIG. 2, the information processing unit 12 may be installed outside the home and configured to give and receive data to and from the information acquisition unit 11 via the out-of-home network 22.

In the information processing system illustrated in FIG. 1, the information acquisition unit 11 and the information processing unit 12 are installed in home and connected via a network constructed in home, for example, a local area network (LAN) configured in a wireless or wired manner, and are configured to give and receive data to and from each other via the network.

Furthermore, the information processing unit 12 is connected to the external service providing unit 21 via the out-of-home network 22, and is configured to give and receive data to and from the external service providing unit 21.

Figure 2:
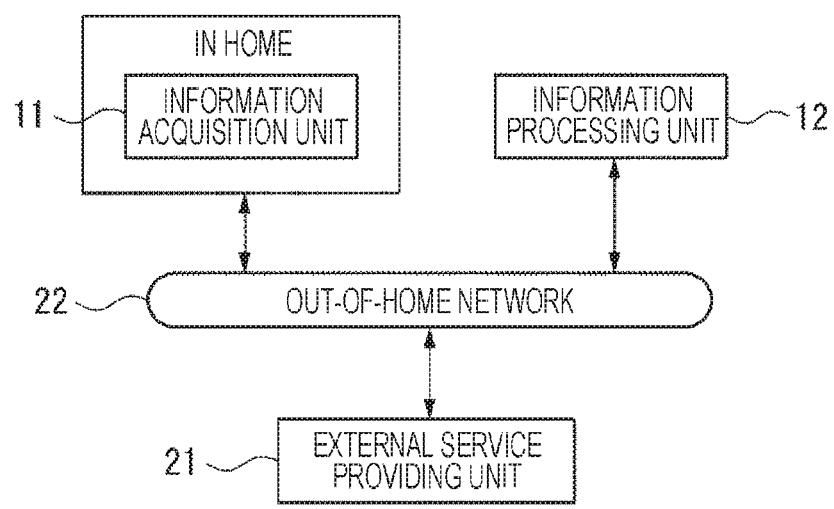
FIG. 2 is a diagram illustrating a configuration of another information processing system.

In the information processing system illustrated in FIG. 1 or 2 (hereinafter, description continues using the information processing system illustrated in FIG. 1 as an example), information is acquired by the information acquisition unit 11. The acquired information is, for example, a reaction of a user, an utterance of a user, a conversation between users, information for identifying a user, a surrounding situation, or the like.

The information acquired by the information acquisition unit 11 is supplied to and processed by the information processing unit 12. The information processing unit 12 executes, for example, processing of conveying a message from a predetermined user (called sender) to a user specified by the sender as a recipient of the message, and requesting a user (called messenger) other than the recipient to convey the message to the recipient in a case where the message cannot be directly conveyed to the recipient. Furthermore, the information processing unit 12 makes an inquiry about predetermined information to the external service providing unit 21, and provides an inquiry result to the user.

The external service providing unit 21 may be a server so-called search server, or a server that manages a shopping site that offers shopping and the like.

<Processing Example in System>

An example of processing in the information processing system illustrated in FIG. 1 will be described with reference to FIGS. 3 and 4.

At time T1 (FIG. 3), the information processing unit 12 receives a message from a sender (father in FIG. 3, hereinafter described as sender 31), and conveys the message to a recipient (mother in FIG. 3, hereinafter described as recipient 32).

Here, description is given using a message as an example. However, the present technology can be applied to when conveying some sort of information to the recipient 32. In other words, the message described here by way of example is an example of information, and the information presented to the user is not description limited to a message.

Figure 3:
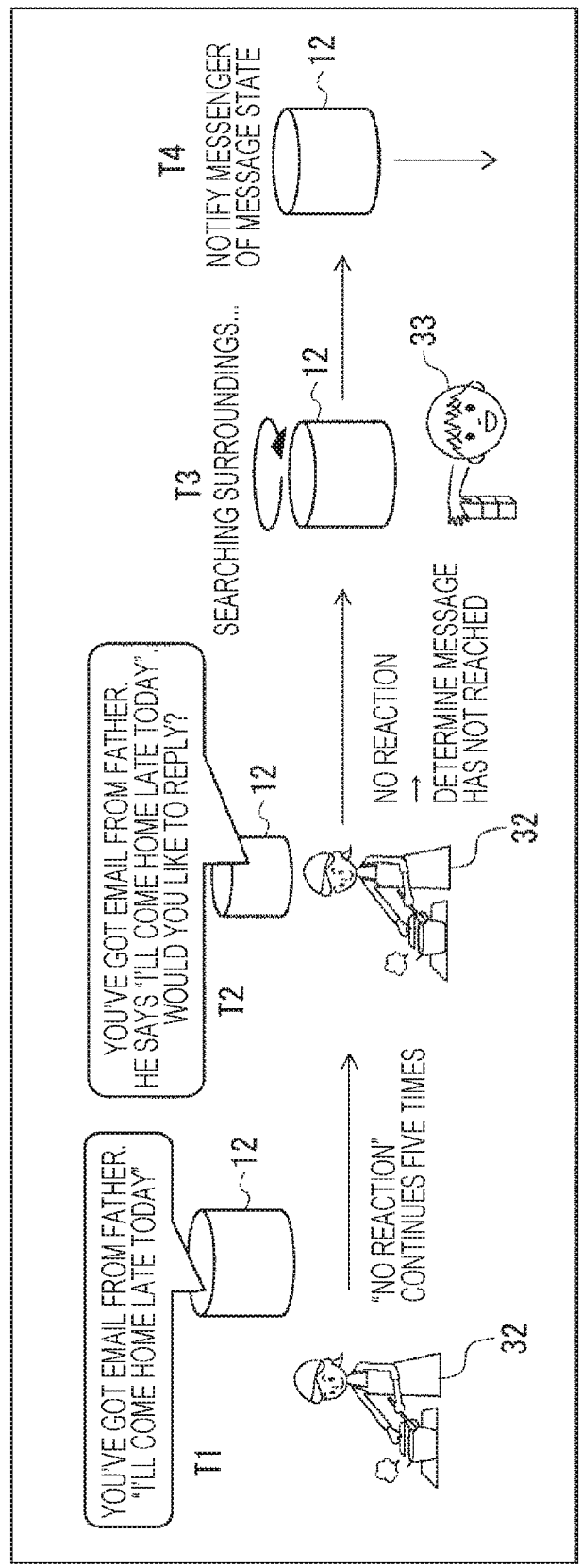
FIG. 3 is a diagram for describing an operation of the information processing system.
Figure 4:
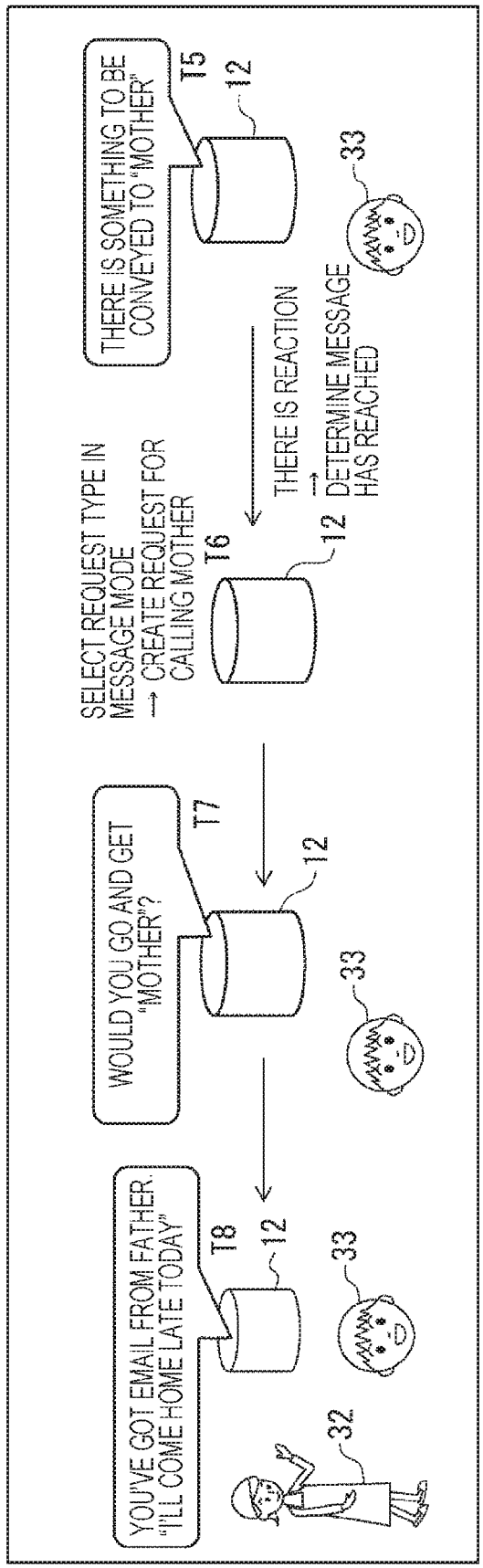
FIG. 4 is a diagram for describing an operation of the information processing system.

For example, in the example illustrated in FIG. 3, the information processing unit 12 receives an email of "I'll come home late today" from the sender, and thus conveys a message such as "You've got an email from Father "I'll come home late today"" to the recipient 32 by voice, for example.

Assuming that the recipient 32 is, for example, cooking, and cannot hear the message from the information processing unit 12 and does not take any reaction. Note that examples of the situation where the recipient 32 does not show any reaction include a situation where the recipient 32 does not notice the message and does not take any reaction, and a situation where the recipient 32 does notice the message but does not take any reaction for any reason such as being busy.

The information processing unit 12 repeatedly conveys the message to the recipient 32, detects the reaction of the recipient 32 each time, and determines whether or not there is a reaction. In a case where such determination is repeated, for example, five times, but it is determined that the recipient 32 has not taken a reaction, words for confirming whether or not the message has been conveyed are added and the message is conveyed again.

At time T2, the information processing unit 12 conveys a message such as "You've got an email from Father. He says "I'll come home late today". Would you like to replay?" to the recipient. In this case, words such as "Would you like to reply?" for confirming whether or not the message has been conveyed are added.

In a case where the recipient 32 does not take a reaction even though the message with "the words for conforming whether or not the message has been conveyed" has been conveyed, the message from the information processing unit 12 has been determined not to reach the recipient 32.

In a case where such determination has been made, the information processing unit 12 searches surroundings at time T3. This search is performed to find a user (referred to as a messenger 33) near the information processing unit 12, in other words, within a range where the message is conveyable from the information processing unit 12. In a case where the information processing unit 12 is disposed in each room, a user who is in the room is set as a search target.

Assuming that a child (messenger 33) has been found as a result of the search of the surroundings of the information processing unit 12 at time T3. In such a case, the found child is set as the messenger 33 who conveys the message to the recipient 32 (who conveys that there is the message).

Note that the messenger 33 is a user who is given a role of conveying the message to the recipient 32 on behalf of the information processing unit 12 or conveying that there is the message from the information processing unit 12 to the recipient 32, when the message from the sender 31 is not conveyed to the recipient 32.

Note that, as described below, the sender 31 may also be included in the messenger 33. In other words, the messenger 33 can be a user other than the recipient 32

In a case where the messenger 33 has been found at time T3, the messenger 33 is notified of a message state at time T4. Then, at time T5 (FIG. 4), the information processing unit 12 sends a message such as "there is something to be conveyed to "mother"" to the messenger 33. Whether or not the messenger 33 (the child in this case) has taken any reaction, for example, has raised a hand or has replied to the message is determined.

In a case where the messenger 33 has been determined to take a reaction to the message, the message is determined to be conveyed. In a case where such determination has been made, at time T6, a request type in a message mode is calculated, and in the case of this example, a request for getting the mother is created. The request type is set according to the age of the messenger 33, the content of the message from the sender 31 (the message desired to be conveyed to the recipient 32), or the like, as will be described below.

At time T7, the information processing unit 12 sends a message such as "Would you go and get "mother"?" to the messenger 33. The messenger 33 understands the message from the information processing unit 12 and takes an action. In this case, the child who is the messenger 33 goes and gets the mother who is the recipient 32.

In a case where the messenger 33 goes to the recipient 32 and the recipient 32 approaches the information processing unit 12, the message is conveyed to the recipient 32. In this case, at time T8, the information processing unit 12 conveys the message "You've got an email from Father. He says "I'll come home late today"" to the recipient 32 (mother).

Thus, at time T1, the message from the sender 31 had not been conveyed to the recipient 32, but the existence of the message was able to be conveyed to the recipient 32 via the messenger 33, and at time T8, the message from the sender 31 has been reliably conveyed to the recipient 32.

<Configuration of Information Acquisition Unit and Information Processing Unit>

A configuration of the information processing unit 12 that performs such processing will be described.

FIG. 5 is a diagram illustrating a configuration of an example of the information processing unit 12. Note that the information processing unit 12 illustrated in FIG. 5 includes a configuration of the information acquisition unit 11. In other words, the configuration of the information processing unit 12 in a case where the information acquisition unit 11 and the information processing unit 12 are integrated will be described. Therefore, part of the configuration illustrated in FIG. 5 may be the information acquisition unit 11 and separately configured from the information processing unit 12.

The information processing unit 12 includes a voice acquisition unit 101, a voice output unit 102, a voice processing unit 103, an image acquisition unit 104, a display unit 105, an image processing unit 106, a communication unit 107, an operation input unit 18, a control unit 109, and a database 110.

The voice acquisition unit 101 includes, for example, a microphone, and acquires a sound uttered by the user, an ambient sound, and the like. The voice output unit 102 includes, for example, a speaker, and outputs a voice when conveying a message to the user by voice. The voice processing unit 103 processes the voice acquired by the voice acquisition unit 101, and generates a voice to be output by the voice output unit 102.

For example, when determining whether or not there is a reaction from the recipient 32 at the time T1, the voice acquisition unit 101 acquires content uttered by the recipient 32, and the voice processing unit 103 performs determination by analyzing the acquired voice.

Furthermore, when sending a message to the recipient 32 at the time T1, the voice processing unit 103 generates voice data of the message to be output and the voice output unit 102 outputs the message.

The image acquisition unit 104 includes, for example, a camera, and captures and acquires images of the user and the surroundings. The display unit 105 includes, for example, a display, and displays an image when conveying a message to the user with the image. The image processing unit 106 processes the image acquired by the image acquisition unit 104, and generates an image to be displayed on the display unit 105.

For example, when searching for the messenger 33 at the time T3, the image acquisition unit 104 captures an image, and the image processing unit 106 performs a search by analyzing whether or not a user who can be the messenger 33 has been captured in the captured image.

Furthermore, when sending a message to the recipient 32 at the time T3, the image processing unit 106 generates image data (or text data or the like) of the message to be output, and the display unit 105 displays the message.

The communication unit 107 gives and receives data to and from the external service providing unit 21 via the in-home network 22 (FIG. 1), and gives and receives data to and from another information acquisition unit 11 or another information processing unit 12 in a case where a plurality of information acquisition units 11 and information processing units 12 are provided.

The operation input unit 108 includes a touch panel, a keyboard, and the like, and receives an operation from the user. The control unit 109 controls each unit in the information processing unit 12. The database 110 includes a plurality of databases, and stores data and tables required when the above-described processing is executed.

<Databases>

The database 110 stores a plurality of data and tables required when the above-described processing is executed. Here, description will be added regarding the plurality of databases included in the database 110.

FIG. 6 is a diagram illustrating an example of a user attribute information database 110a. The user attribute information database 110a is a database that manages name, gender, age, and hearing in association with one another. For example, names such as "mother", "child", and "father" are managed as the name. Note that, here, description will be continued using "mother" or the like, which is not a name in general, as the name, for the sake of description.

Furthermore, for example, the name "mother" in the user attribute information database 110a is associated with information of the gender "female", the age "38", and the hearing "normal". Furthermore, for example, the name "child" is associated with information of the gender "male", the age "5", and the hearing "good". Furthermore, for example, the name "father" is associated with information of the gender "male", the age "40", and the hearing "poor".

Such a user attribute information database 110a is constructed by acquiring information from the user, for example, acquiring information regarding a reaction from the user when a message has been sent.

FIG. 7 is a diagram illustrating an example of a detection information database 110b. The detection information database 110b is a database that manages information detected by the information processing unit 12. For example, as items of the detection information database 110b illustrated in FIG. 7, "object recognition information", "position detection", "existence direction", "distance", "face detection", "nod detection", "head direction", "volume", "voice recognition result", "semantic analysis result", "gaze detection", and "gesture detection" are provided. Furthermore, these items are provided as detection items for subjects such as "mother", "child", "father", "noise source A", and "noise source B".

For example, referring to FIG. 7, as detection results of a predetermined time, "person" as the "object recognition information", "Yes" as the "position detection", "south" as the "existence direction", "5 m" as the "distance", "No" as the "face detection", "No" as the "nod detection", "south" as the "head direction", "0" as the "volume", "None" as the "voice recognition result", "None" as the "semantic analysis result", "No" as the "gaze detection", and "No" as the "gesture detection" are recorded for the subject "mother".

In this case, it is recorded that the "mother" has been detected as the "person" at a position 5 m away in the "south" direction. Furthermore, at this time, a detection result that a message has been conveyed but a reaction from which reception of the message can be determined has not been made by nodding or a gesture is also recorded. Alternatively, a detection result that it has not been a situation to convey the message, and thus a reaction from which reception of the message can be determined by nodding or a gesture has not been detected is also recorded.

Furthermore, not only a detection result regarding a person but also a detection result regarding a sound is recorded in the detection information database 110b. For example, a sound may hinder transmission when a message is conveyed by voice and is thus a detection target. For example, in the detection information database 110b illustrated in FIG. 7, detection results that a burner is detected as the noise source A, the burner is located 5 m away in the south direction, and the volume is high (large) are written.

Such a detection information database 110b is updated at predetermined intervals. Furthermore, detection processing may be performed as needed when, for example, a message is output, and a result of the detection processing may be written. Furthermore, usually, the detection processing is performed at long intervals and the result is written, and when a message is output, the detection processing may be performed at short intervals and the result may be written.

FIG. 8 is a diagram illustrating an example of a voice output information database 110c. The voice output information database 110c is a database that manages a message output as voice. The voice output information database 110c is a database that manages an output content ID, output content, a notification destination, a notification source, time, and urgency in association with one another.

For example, in the output content ID of "1", the output content of "Mother's favorite singer A will appear on an Internet TV program PPP from 19:30 today", the notification destination of "mother", the notification source of "system", the time (time of notification) of "12:00", the urgency of "normal" are managed in association with one another. In a case where the notification source is the "system", this case indicates that the information processing unit 12 has communicated with the external service providing unit 21, for example, and has conveyed the acquired information to the user.

Furthermore, for example, in the output content ID of "2", the output content of "contact with school immediately", the notification destination of "mother", the notification source of "school", and the time of "12:15", and the urgency of "high" are managed in association with one another.

Data is added to such a voice output information database 110c when a message is conveyed to the user by voice. Note that a function to delete the data in chronological order or a function to delete the data when the message has been successfully transmitted to the user may be provided.

FIG. 9 is a diagram illustrating an example of a voice output trial result information database 110d. The voice output trial result information database 110d is a database that manages a result indicating whether or not a message has been successfully transmitted to the user (recipient 32) as a result of outputting the message.

The voice output trial result information database 110d is a database that manages an output content ID, the number of achieved output trials, an output trial time, and TTS control in association with one another. TTS is an abbreviation of text-to-speech, and indicates processing regarding text-to-speech for artificially synthesizing human voice and converting texts (sentence) into a voice.

As the output content ID, the same ID as the output content ID of the voice output information database 110c illustrated in FIG. 8 is assigned to the same message.

For example, in a message with the output content ID of "1", the output trial being performed five times, the output trial time of 10 sec, the TTS control of "Normal" are managed in association with one another. Furthermore, for example, in a message with the output content ID of "2", the output trial being performed zero times (not yet output), the output trial time of "not yet", and the TTS control of "high pitch, time shortened" are managed in association with one another.

Such a voice output trial result information database 110*d* is updated when a message is output. Furthermore, the detection information database 110*b* (FIG. 7) is also updated when the voice output trial result information database 110*d* is updated.

For example, for the message with the output content ID of "1", a result that the output trial has been performed five times is described in the voice output trial result information database 110*d*. The trial of five times means that the message has been repeatedly output because the recipient 32 (the mother in this case) had not shown a reaction that she had received the message. In such a case, as illustrated in FIG. 7, information of "No" is written in the items of face detection and nod detection.

For example, in a case where a message is output, and the recipient 32 notices the output of the message and looks at the information processing unit 12, the face of the recipient 32 can be detected. Furthermore, for example, in a case where a message is output, and the recipient 32 understands the content of the message and nods, the information processing unit 12 can detect the nodding.

The situation where the information of "No" is written in the items of face detection and nod detection, as illustrated in FIG. 7, indicates a situation where the recipient 32 has not performed a reaction such as looking at the information processing unit 12 or nodding.

The face detection and the nod detection can be performed by capturing the user (recipient 32) by the image acquisition unit 104 (FIG. 5), and analyzing the captured image (video) by the image processing unit 106, for example.

For example, when a message is output, the recipient 32 is detected from the captured image of the recipient 32, whereby the face detection is performed. Furthermore, for example, the nod detection is performed by comparing captured images of the recipient 32 before and after outputting the message or analyzing the video, detecting the position of the head of the user, and determining whether or not the user has performed an action corresponding to a nodding action from the movement of the head.

As illustrated in FIG. 7, information of "0" is written in the item of volume. Furthermore, information of "None" is written in the items of voice recognition result and semantic analysis result. For example, in a case where a message is output, and the recipient 32 notices the output of the message and utters some voice, the information processing unit 12 can detect the voice as the volume.

Furthermore, in a case where the recipient 32 has uttered some voice, if utterance of words indicating that the message has been received, such as "OK", can be analyzed by analyzing the voice, for example, the recipient 32 having reacted to the reception of the message can be detected. In this case, the reaction to the reception of the message is detected when the voice recognition result is semantically analyzed.

Furthermore, in a case where the recipient 32 has uttered some voice, and the voice is analyzed and a recognition result such as "today's weather" is obtained, for example, the reaction not to the reception of the message is detected when the voice recognition result is semantically analyzed.

Information of the volume, the voice recognition result, and the semantic analysis result is output by acquiring the voice of the user (recipient 32) by the voice acquisition unit 101 (FIG. 5) and analyzing the acquired voice by the voice processing unit 103.

For example, in a case where the recipient 32 outputs some voice when a message is output, the volume is detected. Furthermore, what kind of words has been uttered can be detected by recognizing the voice.

Moreover, whether or not the reaction is to the reception of the message, or whether or not the utterance is not related to the reception of the message can be determined by semantically analyzing the voice recognition result. For example, when the result of the semantic analysis is a result such as "yes" or "ok", it can be determined that the reaction is to the reception of the message.

The voice processing unit 103 includes a database and a function for performing such voice recognition and semantic analysis.

As illustrated in FIG. 7, information of "No" is written in the item of gaze detection. For example, in a case where detection of an action of looking at the information processing unit 12 is set as the reaction to the reception of a message, in other words, in a case where the gesture of looking at the information processing unit 12 is one of reactions to the reception of a message, detection of the gaze is performed by capturing the user (recipient 32) by the image acquisition unit 104 (FIG. 5) and analyzing the captured image (video) by the image processing unit 106.

Then, whether or not the detection direction is directed to the information processing unit 12 is determined. The information of the gaze detection in the detection information database 110*b* is "Yes" in a case where the detection direction is directed to the information processing unit 12, and is "No" in a case where the detection direction is not directed to the information processing unit 12.

As illustrated in FIG. 7, information of "No" is written in the item of gesture detection. In a case where a gesture predefined as the reaction to the reception of a message is detected, as in the gaze detection, information of "Yes" is written in the item, and information of "No" is written in a case where the gesture is not detected. As the gesture, for example, there is an action such as raising a hand or waving a hand.

Thus, the detection information database 110*b* is also updated along with the update of the voice output trial result information database 110*d*.

Note that, here, the voice output information database 110*c* has been illustrated in FIG. 8 and the voice output trial result information database 110*d* has been illustrated in FIG. 9. However, the voice output information database 110*c* and the voice output trial result information database 110*d* may be configured as one database.

Furthermore, description will be continued on the assumption that a message is output by voice from the information processing unit 12, and thus these databases regarding voice are created. However, in a case of outputting a message by images, videos, texts, or the like, a database regarding images is similarly created to these databases regarding voice.

Such databases are managed by the database 110. Furthermore, the database 110 also manages a plurality of tables described below.

FIG. 10 is a diagram illustrating an example of a conveyance confirmation utterance generation template table 110*e*. The conveyance confirmation utterance generation template table 110*e* is a table that is referred to when a conveyance confirmation utterance is performed at the time T2 when a reaction of the recipient 32 has not been able to be obtained even though a message has been repeatedly conveyed five times at the time T1 in the description with reference to FIGS. 3 and 4, for example.

In other words, the conveyance confirmation utterance generation template table 110e is a table that is referred to when determining what kind of conveyance confirmation utterance is to be performed when a conveyance confirmation utterance is performed.

The conveyance confirmation utterance generation template table 110e is a table that manages a template ID and a template in association with each other. Furthermore, the conveyance confirmation utterance generation template table 110e illustrated in FIG. 10 manages, as the template, a template for motion response promotion and a template for utterance response promotion.

For example, the template ID for motion promotion of "M-1-1" is a template such as "(name info), please raise your hand in a case where you can immediately respond to (system info)". In a case where this template has been selected, for example, a message for respond promotion such as "Mother, please raise your hand if you can immediately respond to the message" is output.

As the template for motion promotion, templates such as "Please turn this way" and "Please nod" are prepared in addition to the template of "Please raise your hand". Which template is selected from among these templates can be made in consideration of the state of the recipient 32, for example.

For example, in a case where it is determined that the recipient 32 is cooking (in a case where it is determined that the recipient 32 is busy), the template such as "Please turn this way" or "Please nod" is selected. Furthermore, for example, when the recipient 32 faces the information processing unit 12 side and the face detection can be performed but a reaction cannot be obtained, the template such as "Please raise your hand" or "Please nod" is selected.

Further, referring to the conveyance confirmation utterance generation template table 110e illustrated in FIG. 10, for example, the template ID of "V-1-1" is a template such as "(name info), can you or can't you respond to the message of (output info)?". In a case where this template has been selected, a message for response promotion such as "Mother, can you or can't you respond to the message of 'I'll come home late today' from Father?" is output.

The template for utterance promotion is formed in a question form such as "can you or can't you?" to obtain a replay.

The conveyance confirmation utterance generation template table 110e is referred to when a response confirmation message is output at the time T2 (FIG. 3), as described above. However, for example, the conveyance confirmation utterance generation template table 110e is also referred to in a case where the messenger 33 (child) is detected and a message has been output to the messenger 33 (time T5 (FIG. 4)) but there has been no reaction, and the conveyance confirmation utterance is performed for the messenger 33.

FIG. 11 illustrates a table that is referred to when such a table is referred to and the conveyance confirmation utterance is performed, and whether or not a reaction from the recipient 32 has been obtained is determined. FIG. 11 illustrates an example of a response to conveyance confirmation utterance determination table 110f.

The response to conveyance confirmation utterance determination table 110f is a table that manages a template ID, response expectation, and possibility of continuation in association with one another.

As for the template ID, the same ID as the template ID of the conveyance confirmation utterance generation template table 110e is assigned. For example, when a template with the template ID of "M-1-1" is selected in the conveyance confirmation utterance generation template table 110e and a message is output, the response expectation with the template ID of "M-1-1" in the response to conveyance confirmation utterance determination table 110f is referred to.

The response expectation in the response to conveyance confirmation utterance determination table 110f is an action or an utterance expected as a response of the recipient 32 as a result of the conveyance confirmation utterance. For example, the template with the template ID of "M-1-1" is selected in the conveyance confirmation utterance generation template table 110e and the message for response promotion such as "Mother, please raise your hand in a case where you can immediately respond to the message" is output, the content of "detect an arm has been raised higher than the head in the gesture detection" is referred to as the response expectation of the template ID of "M-1-1" in the response to conveyance confirmation utterance determination table 110f.

In this case, in a case where "an arm has been raised higher than the head in the gesture detection" has been detected, it is determined that expectation as the response expectation has been satisfied, and a response has been obtained.

The possibility of continuation in the response to conveyance confirmation utterance determination table 110f is information indicating whether or not to continuously convey a message or the like when the response expected as the response expectation has been obtained. For example, in the above-described case, in the case where "an arm has been raised higher than the head in the gesture detection" has been detected, information of the possibility of continuation is "possible", and thus information desired to be provided to the recipient 32, such as a message, is continuously conveyed to the recipient 32.

For example, in a case where the response expectation is "the voice recognition result is "no", "wait a minute", "later please", or "not now"", the information of the possibility of continuation is "not possible". Therefore, in a case where the response from the recipient 32 is, for example, an utterance such as "no", information transmission with a message or the like to the recipient 32 is temporarily stopped. In such a case, transmission of information is resumed after a predetermined time has elapsed or when an utterance such as "What was the previous message?" is performed from the recipient 32.

Note that a plurality of response expectations is written in the response to conveyance confirmation utterance determination table 110f. Determination such as there having been a response, or information presentation being continued or not continued can be performed by a combination of the response expectations.

For example, it can be determined that there is a response by movement such as raising a hand. Furthermore, it can be determined that there is a response by voice such as "yes". Furthermore, it can be determined that there is a response due to movement such as raising a hand, but in a case where a voice including a denial such as "no", "wait a minute", "later", or "not now" has been detected, it can be determined that the information presentation cannot be continued.

FIG. 12 is a diagram illustrating an example of a message call request generation template table 110g. The message call request generation template table 110g is, for example, a table referred to when creating a message for calling the messenger 33 at time T5 (FIG. 4).

The message call request generation template table 110g is a table that manages a message call request template. Furthermore, the message call request generation template table 110g manages the message call request templates for infants and for adults.

For example, as the message call request template for infants, templates such as "(name info), please listen", "(name info), can you come here", and "there is something to ask you to convey to (target user)" are prepared. For example, as illustrated at the time T5 in FIG. 4, in a case where the messenger 33 is a child (infant), an appropriate template at the point of time is selected from the templates prepared as the message call request templates for infants.

Furthermore, for example, as the message call request template for adults, templates such as "(name info), there is a message for (target user)", and "(name info), are you busy now or not?" are prepared. In a case where the messenger 33 is an adult, an appropriate template at the point of time is selected from the templates prepared as the message call request templates for adults.

FIG. 13 is a diagram illustrating an example of word conversion synonym table 110h. When outputting a message to the user (to the recipient 32 or the messenger 33) by reference to the above-described table, in a case where the target of the message is a child, for example, the message can be made more appropriate for the user after converting the message into a message for children and outputting the message. To realize such conversion, the word conversion synonym table 110h is provided.

The word conversion synonym table 110h is referred to when converting a template in the conveyance confirmation utterance generation template table 110e into a template for infants, for example. For example, words such as "respondable" or "response" in the templates in the conveyance confirmation utterance generation template table 110e are converted into "Can you answer?" by reference to the word conversion synonym table 110h.

For example, in a case where a conveyance confirmation utterance message to be output to an adult is "Mother, please raise your hand in a case where you can immediately respond to the message", the message is converted into a message such as "YYY, can you answer to the system soon. Please raise your hand" by reference to the word conversion synonym table 110h for infants. Note that because a person whom the system talks to is different, the subject and object of the message are converted according to the person whom the system talks to.

Furthermore, information for converting a message into words easily understandable by the person whom the system talks to is written in the word conversion synonym table 110h. For example, in a case where elderly people are not familiar with a name of "AXB" that is a female idol group, and when conveying information regarding "AXB" to an elderly person, the message is converted into a message in which "AXB" is replaced with "female idol group" and is conveyed to the elderly person.

Furthermore, information for converting an uncommon word into a common word is written in the word conversion synonym table 110h. For example, in a case where a name of "gramophone" is not commonly used, and when conveying information regarding "gramophone", the message is converted into a message in which "gramophone" is replaced with "record player" and is conveyed.

Furthermore, information for converting generally unfavorable (inappropriate) words into wording that can be relatively appropriate is also written in the word conversion synonym table 110h. For example, when conveying information of "dead", the message is converted into a message in which "dead" is replaced with "deceased" and is conveyed.

Furthermore, although not illustrated, to transmit information to a user in a different language, information for converting a language into a foreign language may also be written in the word conversion synonym table 110h.

FIG. 14 is a diagram illustrating an example of a message template table 110i. The message template table 110i is a table that is referred to when conveying message content to the messenger 33.

For example, in the message template table 110i, as a message template for normal use, a template such as "There is a contact from (sender user) to (target user) at (time info) and (sender user) says "(output info)". Would you convey the message?" is described. In a case where this template has been selected, for example, a message such as "There is a contact from Father to Mother at 19:30 and he says "I'll come home late today". Would you convey this message?" is created and is conveyed to the messenger 33.

Furthermore, for example, in the message template table 110i, as a template for asking for coming in front of the system, a template such as "Would you notify that please come here because there is an urgent business to (target user)?" is described. In a case where this template has been selected, for example, a message such as "Would you notify that please come here because there is an urgent business to Mother?" is created and is conveyed to the messenger 33.

This template is selected, for example, in a case where the message becomes long and the burden on the messenger 33 becomes heavy when using the message template for normal use, in a case where the transmission content is not suitable for the messenger 33 (such as confidential information), in a case where the concentration of recipients 32 is low and it is better to get the recipient 32 close to the system, or the like.

Furthermore, for example, in the message template table 110i, as a template for confirmation in another device, a template such as "Would you notify that an email has been sent because there is an urgent business to (target user)?" is described. In a case where this template has been selected, for example, a message such as "Would you notify that an email has been sent because there is an urgent business to Mother?" is created and is conveyed to the messenger 33.

This template is also selected, for example, in the case where the message becomes long and the burden on the messenger 33 becomes heavy when using the message template for normal use, in a case where it is determined that it is better to convey the message by text or image to the recipient 32, or the like.

Furthermore, for example, in the message template table 110i, as a message template in case of urgency, a template such as "Would you convey that "(output info)" because of an urgent matter?" is described. In a case where this template has been selected, a message such as "Would you convey "contact school immediately" because of an urgent matter?" is created, for example, and is conveyed to the messenger 33.

This template is selected in a case where, for example, it is determined that the transmission content needs to be given in notification urgently, for example, in a case where a word such as "immediately" or "important" is included in the message. Furthermore, in a case where the template in case of urgency has been selected, the message may be output with a larger volume than normal time.

Furthermore, for example, in the message template table 110i, as a template for feedback, a template such as "Would you directly contact because "(output info)" has not been able to be conveyed?" is described. In a case where this template has been selected, a message such as "Would you directly contact because "I'll be late today" has not been able to be conveyed?" is created, for example, and is conveyed to the messenger 33.

This template is selected when notifying (feeding back) the sender 31 that the message desired to be conveyed to the recipient 32 has not reached the recipient 32, and further, conveyance of the message has not been able to be requested to the messenger 33.

The conveyance of the message has not been able to be requested to the messenger 33 includes, for example, when the conveyance of the message itself has not been able to be requested because the messenger 33 has not been found, when the messenger 33 has been found but the messenger 33 has refused the conveyance of the message (there has been no reaction even through a request message has been sent), or in a case where the messenger 33 has not correctly conveyed the message to the recipient 32 (for example, the system requested the messenger 33 to go and get the recipient 32 in front of the system but the recipient 32 has not come in front of the system).

For example, as described above, the message template for asking for coming in front of the system and the template for confirmation in another device in the message template table 110i are selected in the case where the message becomes long and the burden on the messenger 33 becomes heavy when using the message template for normal use. As criteria, criteria illustrated in FIG. 15 may be provided.

Figures 15, 16:
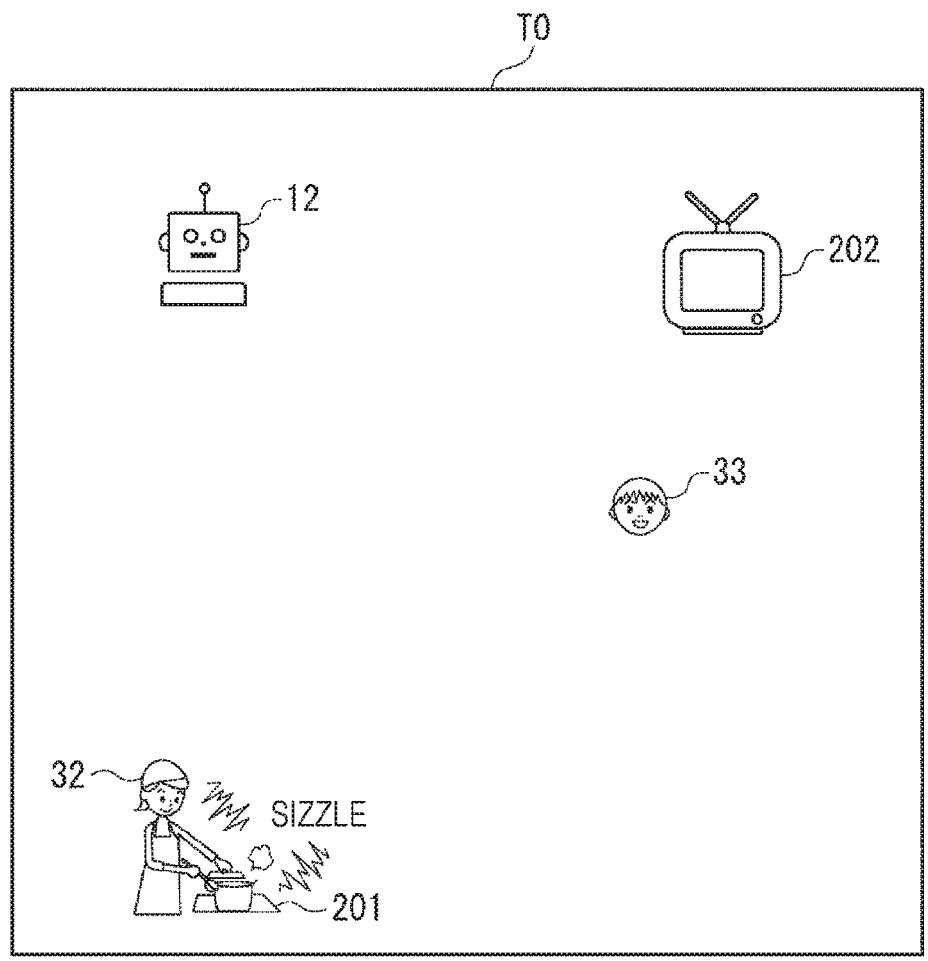
FIG. 15 is a diagram illustrating a configuration of an example of a database.
FIG. 16 is a diagram for describing an operation of the information processing unit.

FIG. 15 is a diagram illustrating an example of a character amount threshold value table 110j. The character amount threshold value table 110j is a table in which a threshold value of the number of characters of a message is described according to the age of the user identified as the messenger 33. The number of characters in this message may be of the entire message or may be the number of characters in a portion corresponding to "(output info)", for example.

For example, in a case of age 5 or younger, in a case where the message includes 10 characters or more, the message template for asking for coming in front of the system is selected. Furthermore, in a case of age 12 or younger, in a case where the message includes 15 characters or more, the message template for asking for coming in front of the system is selected. Furthermore, in a case of age 18 or younger, in a case where the message includes 25 characters or more, the message template for asking for coming in front of the system is selected.

Furthermore, in a case of age 40 or younger, in a case where the message includes 20 characters or more, the message template for asking for coming in front of the system is selected. Furthermore, in a case of age 59 or younger, in a case where the message includes 15 characters or more, the message template for asking for coming in front of the system is selected. Furthermore, in a case of age 60 or older, in a case where the message includes 10 characters or more, the message template for asking for coming in front of the system is selected.

In this way, the template can made selectable depending on the number of characters in the message.

Furthermore, the message to be conveyed by the messenger 33 may be compressed (the number of characters may be reduced). For example, processing of compressing the message such as "Would you convey that Mother's favorite singer A will appear on an Internet TV program PPP from 19:30 today?" into a message such as "Would you convey that the singer A will appear on 19:30 today" may be included.

Such message compression is performed using summarizing techniques or by thinning out vocabulary.

The character amount threshold value table 110j may be referred to and a template may be selected for the message with a reduced number of characters as a result of such compression, or the character amount threshold value table 110j may be referred to and a template may be selected for the message before compression.

Furthermore, in a case where the character amount threshold value table 110j has been referred to and the number of characters has been determined to be equal to or larger than the threshold value set for the age of the messenger 33, compression may be performed to make the number of characters equal or smaller than the threshold value.

For example, in a case where the messenger 33 is the age 18 or younger, in a case of a message with 25 characters or less, the template for normal use is selected. In a case of a message with 25 characters or more, the compression processing for the message is executed, and the message is converted into a message with 25 characters or less. Moreover, in a case where the compressed message still has 25 characters or more, the template for asking for coming in front of the system may be selected.

<Details of Processing Referring to Databases and Tables>

Such databases and tables are used while being appropriately referred to or updated in the flow of processing as described with reference to FIGS. 3 and 4. Here, the flow of the processing described with reference to FIGS. 3 and 4 will be described again including other processing.

At time T0, the information processing unit 12 detects a situation as illustrated in FIG. 16, for example. The situation at the time T0 is a situation where a burner 201 is in a range managed by the information processing unit 12 and the mother (in this case, the user who becomes the recipient 32) is cooking at the burner 201. Furthermore, the situation at the time T0 is a situation where a the television receiver 202 is in the range managed by the information processing unit 12, and a child (in this case, the user who becomes the messenger 33) is in the vicinity of the television receiver 202.

At the time T0 in such a situation, the information processing unit 12 creates the detection information database 110b as illustrated in FIG. 7 (adds or updates data). At the time T0, the user attribute information database 110a illustrated in FIG. 6 has been created.

Figure 17:
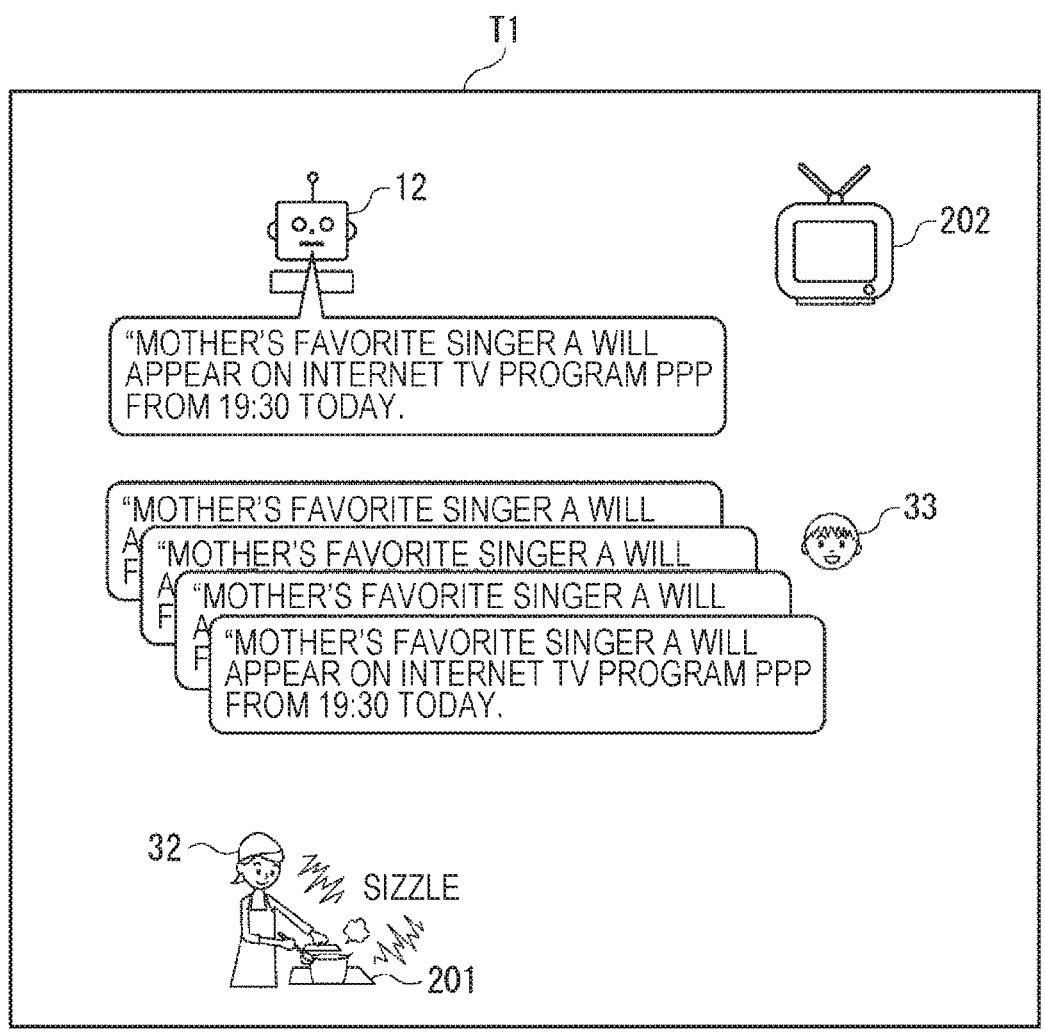
FIG. 17 is a diagram for describing an operation of the information processing unit.

At time T1, the information processing unit 12 conveys, for example, information obtained from the external service providing unit 21 (FIG. 1) to the user (recipient 32). As illustrated in FIG. 17, at the time T1, the information processing unit 12 utters the message such as "Mother's favorite singer A will appear on an Internet TV program PPP from 19:30 today" to the recipient 32. This utterance is output by, for example, Text To Speech.

When such a message is output, information regarding the message is registered in the voice output information database c illustrated in FIG. 8 and the voice output trial result information database 110d illustrated in FIG. 9.

At the time T1, there is no reaction that the message has been received from the recipient 32, so the same message is repeatedly output, and the number of times becomes five times. Here, the description will be continued on the assumption that the mode is switched when the number of trials of the same message is five times as the threshold value. However, the mode may be switched at the number of times other than 5 times.

Figure 18:
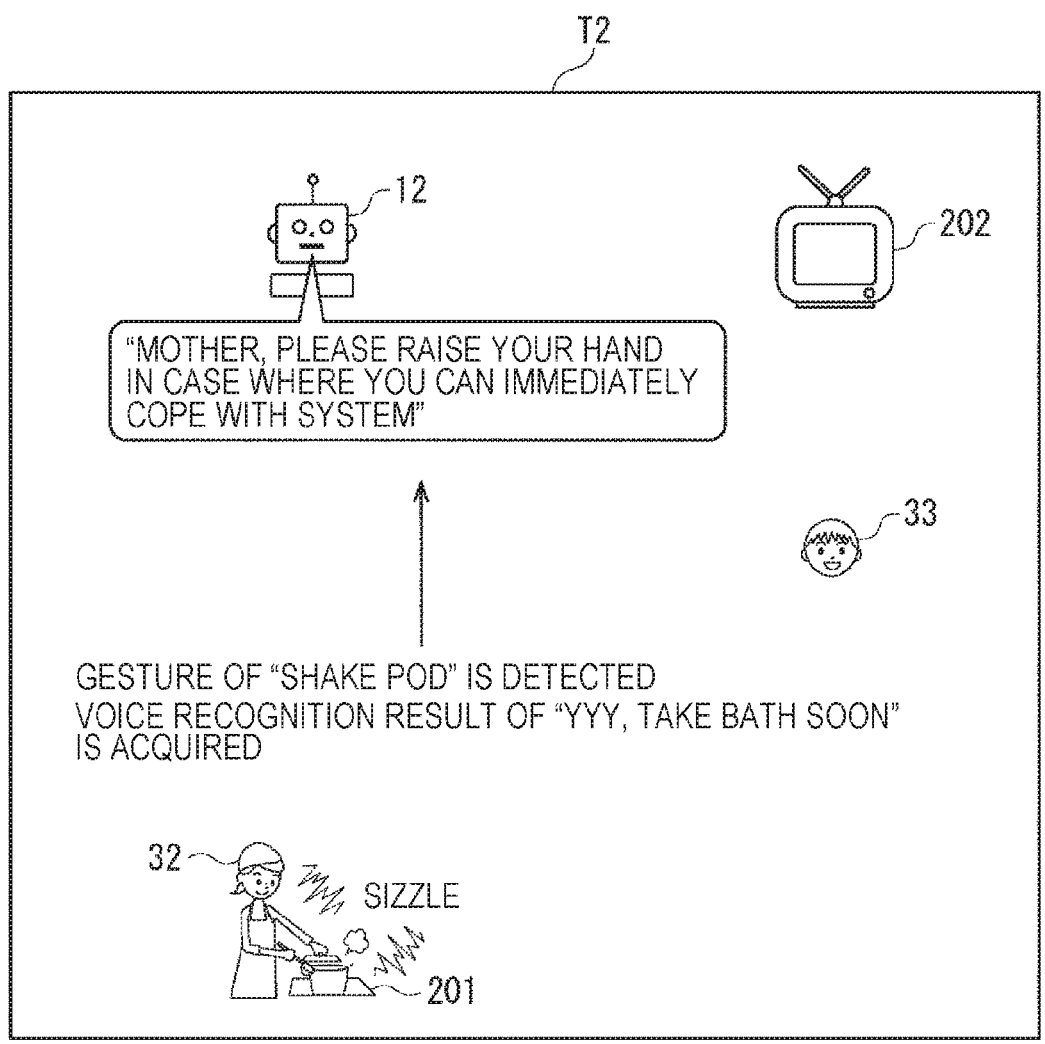
FIG. 18 is a diagram for describing an operation of the information processing unit.

At time T2, the processing transitions to a mode of outputting a conveyance confirmation message. As illustrated in FIG. 18, at the time T2, the information processing unit 12 outputs a message such as "Mother, please raise your hand in a case where you can immediately cope with the system soon". When outputting this message, the information processing unit 12 refers to the conveyance confirmation utterance generation template table 110e illustrated in FIG. 10, and selects an appropriate conveyance confirmation utterance template. This case illustrates a case where the template with the template ID of "M-1-1" has been selected.

When this conveyance confirmation message is output, the volume and pitch for outputting the message may be adjusted in consideration of properties of the user, such as the user's age and good or bad ear, a situation having steady noise such as noise from a vacuum cleaner or a washing machine, and a situation of surroundings having sudden noise such as a child's voice or a sound of a pot.

For example, processing of making the volume for outputting the message large in the situation where the recipient 32 has a property of bad ear or a steady noise is detected, or shortening the time to determine whether or not the recipient 32 has been responded as a result of outputting the message may be executed.

For example, processing of outputting the message at timing when the sudden noise is small in the situation where the sudden noise is detected, or elongating the time to determine whether or not the recipient 32 has responded as a result of outputting the message may be executed.

While outputting such a message, the information processing unit 12 also detects the reaction (response) of the recipient 32. The detection information database 110b (FIG. 7) is updated with the detection result. FIG. 19 illustrates an example (a part) of the detection information database 110b updated at the time T2.

In a case where the recipient 32 has been performing an action of "shaking a pod" and has uttered to the child that "YYY, take a bath soon" when the information processing unit 12 has detected the utterance and the action of the recipient 32 at the time T2, this detection result is written in the detection information database 110b and the database illustrated in FIG. 19 is created.

That is, in this case, the "head direction" in the detection information database 110b having been detected as "west" direction, and "volume" having been detected as "40" are written.

In this case, since the recipient 32 has turned to the direction of the child and has uttered that "YYY, take a bath soon", the direction of the head is changed from the south direction (the detection information database 110b (FIG. 7) at the time T1) to the west direction, and thus information of "west" is written in information of the direction of the head, and the volume changed from 0 to 40 at the utterance of the message is written.

Furthermore, the message uttered by the recipient 32 is detected by the information processing unit 12 and is written in the column of "voice recognition result" in the detection information database 110b. The voice recognition result of "YYY, take a bath soon" written in the column of "voice recognition result" in the detection information database 110b is semantically analyzed, so that this message is analyzed to have the meaning of "command", and the result is written in the column of "semantic analysis result" in the detection information database 110b.

Since the information processing unit 12 performs such detection to determine whether or not a reaction indicating that the message has been received from the recipient 32 has been obtained, the information processing unit 12 outputs a determination result indicating that there is no reaction (response) from the recipient 32 by voice in the case where the result of "command" has been output as the "semantic analysis result".

Furthermore, information of "No" is written in the column of "gaze detection" in the detection information database 110b. The recipient 32 faces the direction of the child, and the gaze is also in the direction of the child and is not in the direction of the information processing unit 12 (system). Therefore, the information of "No" is written in the column of "gaze detection".

Since the information processing unit 12 performs such detection to determine whether or not a reaction indicating that the message has been received from the recipient 32 has been obtained, the information processing unit 12 outputs a determination result indicating that there is no reaction (response) from the recipient 32 by gaze in the case where the result of "No" has been output as the "gaze detection".

Moreover, information of "intensively move back and forth" is written in the column of "gesture detection" in the detection information database 110b. Since the recipient 32 is performing the action of shaking a pot, the hand of the recipient 32 is performing the action of intensively moving back and forth, and this action is detected as a result.

Since the information processing unit 12 performs such detection to determine whether or not the reaction indicating that the message has been received from the recipient 32 has been obtained, the information processing unit 12 determines that there is a reaction by a gesture from the recipient 32 when detecting the gesture of "raised a hand" as the "gesture detection". However, in a case of detecting a gesture other than the gesture of "raised a hand", the information processing unit 12 outputs a determination result indicating that there is no reaction from the recipient 32 by gaze.

The information processing unit 12 determines whether or not there has been a response from the recipient 32 by determining whether or not the information written in the detection information database 110b satisfies the criteria described in the response to conveyance confirmation utterance determination table 110f.

In the example described here, the search information database 110b as illustrated in FIG. 19 is created at the time T3. Therefore, it is determined that there has been no response from the recipient 32. Then, the information processing unit 12 transitions to the message mode.

When the information processing unit 12 has transitioned to the message mode, the information processing unit 12 searches for a user other than the recipient 32 and existing in a range where the information processing unit 12 can output a message. Such a search is performed at the time T3 and the time T4 (FIG. 3). Then, in a case where a user who can become the messenger 33 has been found, processing of requesting the messenger 33 to convey the message is started.

Note that, in a case where a plurality of users who can be the messenger 33 has been found as a result of the search for the messenger 33, determination is performed using an attribute of the users as a determination material. For example, a user with the highest age, a user who responded to a message request in the past, a male user, a female user, or a user with a threshold value or more using a predetermined threshold value can be set as the messenger 33.

When the messenger 33 has been detected, a message for requesting the detected messenger 33 to convey a message is output. At this time, what kind of message is output is set by reference to the message call request generation template table 110g (FIG. 12).

In the message call request generation template table 110g illustrated in FIG. 12, the message call request templates for infants and for adults are prepared. When such a table is referred to, whether the messenger 33 is an infant or an adult is determined. Here, the description will be continued using the case where the messenger 33 is an infant as an example.

Figure 20:
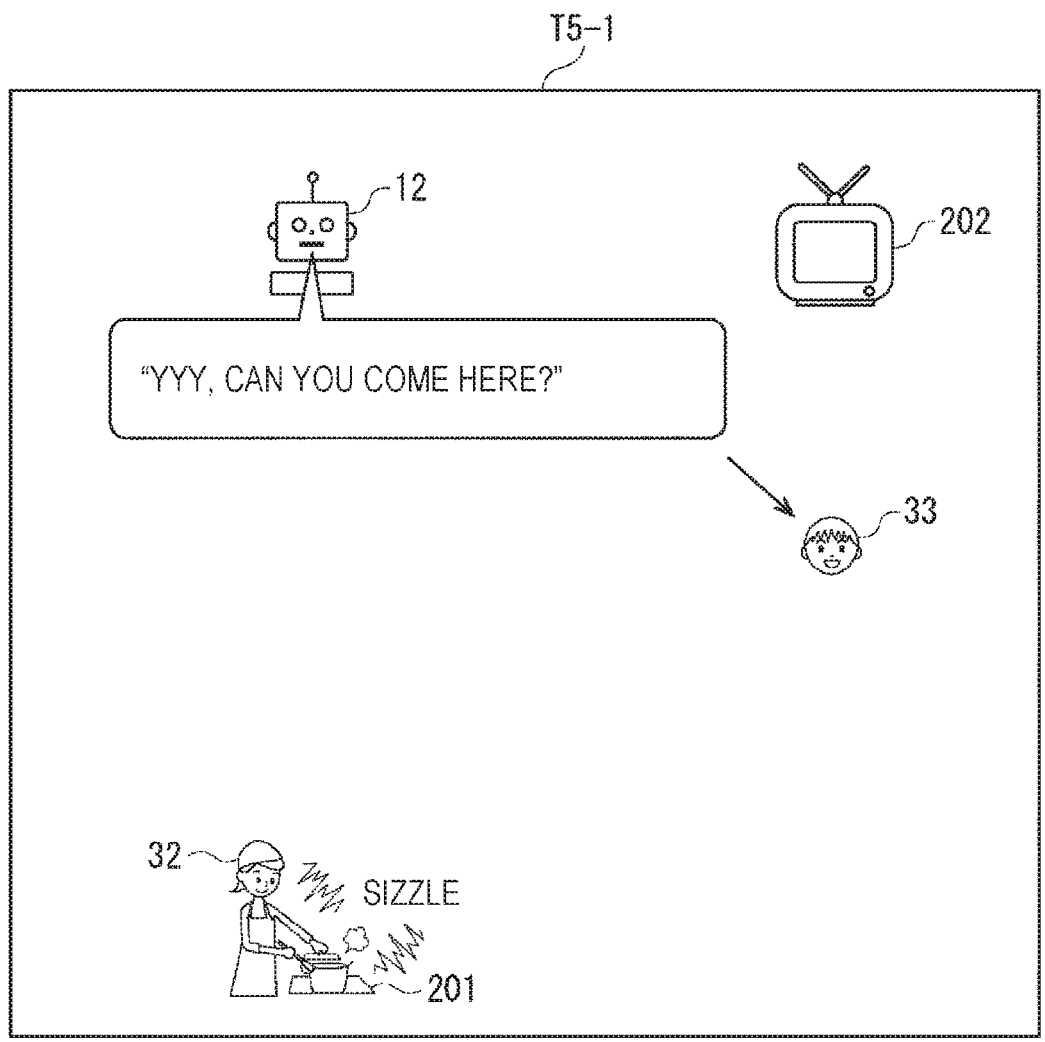
FIG. 20 is a diagram for describing an operation of the information processing unit.

For example, as illustrated in FIG. 20, the template such as "(name info), can you come here?" is selected from the message call request generation template table 110g (FIG. 12), and a message such as "YYY, can you come here?" is output. Note that the name of the messenger 33, in this case, the name of the child, a name registered in advance such as a nickname enters the portion of "YYY" in the "YYY".

As illustrated in FIG. 20, at time T5-1, the information processing unit 12 (system) outputs the message such as "YYY, can you come here?" to the messenger 33. The processing at and after the time T5 is basically the similar to the processing performed for the recipient 32 from the time T1 to time T2. That is, first, whether or not the messenger 33 has reacted as a result of outputting such a message is determined.

In a case where it is determined that the messenger 33 has not reacted as a result of the determination, the conveyance confirmation message is output to the messenger 33, as in the time T2. Note that, the conveyance confirmation message may be output after the message such as "YYY, can you come here?" has been output to the messenger 33, for example. In other words, after the message has been output, the conveyance confirmation message may be output regardless of whether or not there has been a response from the messenger 33.

Figure 21:
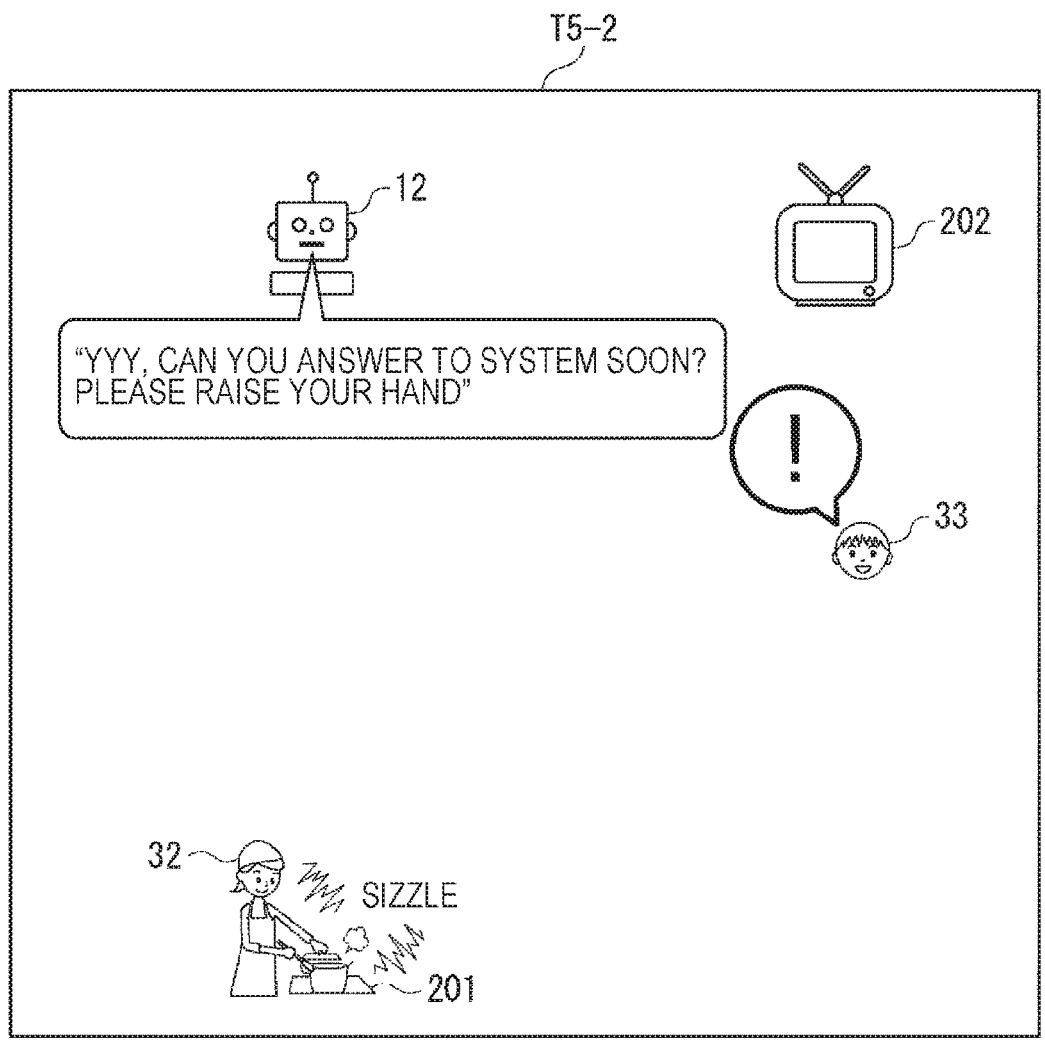
FIG. 21 is a diagram for describing an operation of the information processing unit.

As illustrated in FIG. 21, at time T5-2, the message such as "YYY, can you answer to the system soon? Please raise your hand" is output from the information processing unit 12 to the messenger 33 by Text To Speech. This message is output by selecting a template by reference to the conveyance confirmation utterance generation template table 110e and converting the wording of the selected template into wording for infants by reference to the word conversion synonym table 110h.

Figure 22:
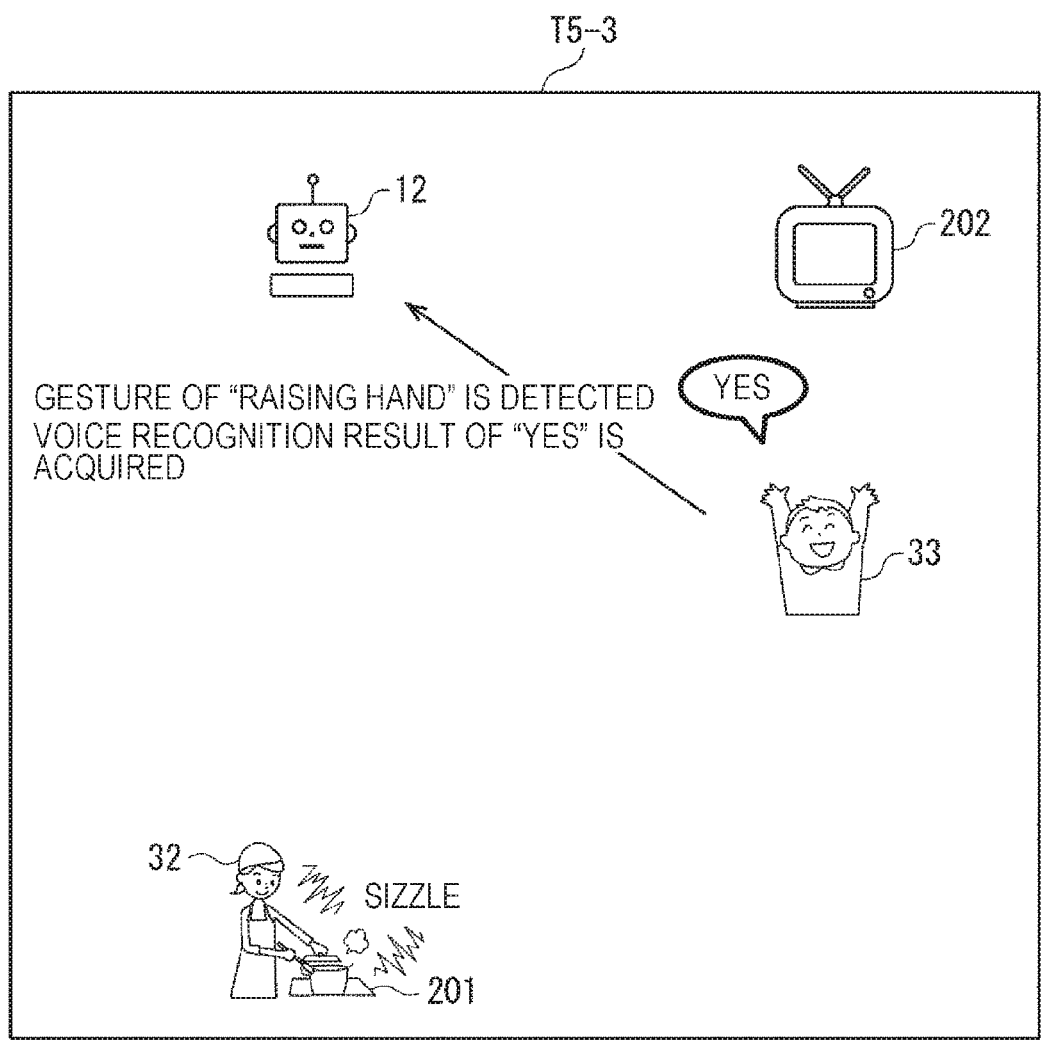
FIG. 22 is a diagram for describing an operation of the information processing unit.

As a result of outputting such a conveyance confirmation message, it is assumed that the messenger 33 has responded by raising a hand or uttering "yes" at time T5-3, as illustrated in FIG. 22. The information processing unit 12 detects the action or the utterance of the messenger 33. In this case, the information processing unit 12 detects that the messenger 33 has noticed the message from the information processing unit 12, and has faced the direction of the information processing unit 12 and has nodded.

When such actions have been detected, "OK" is written in the columns of "face detection" and "nod detection" in the detection information database 110b, as illustrated in FIG. 23. Detection of "northwest" as the direction of the head is also written.

Furthermore, in this case, it is also detected that the messenger 33 has noticed the message from the information processing unit 12 and has uttered "yes". When such an action has been detected, "80" is written in the column of "volume" and "yes" is written in the column of "voice recognition result" in the detection information database 110b, as illustrated in FIG. 23. Furthermore, the semantic analysis of "agreement" can be obtained by semantically analyzing "yes" as a voice recognition result. Therefore, "agreement" is written in the column of "semantic analysis result" in the detection information database 110b.

Furthermore, in this case, the messenger 33 faces the direction of the information processing unit 12 (system), and thus the gaze is also detected. "YES" is written in the column of "gaze detection" in the detection information database 110b.

Furthermore, the messenger 33 has performed the action of raising a hand and thus this action is detected as a gesture. The "raising a hand" is written in the column of "gesture detection" in the detection information database 110b.

It is determined that the messenger 33 has responded to the message from these detection results. In a case where it is determined that there has been a response from the messenger 33, the request type in the message mode is selected (time T6 (FIG. 4)).

The message template table 110i (FIG. 14) is referred to when the request type is selected. Furthermore, as described with reference to FIGS. 14 and 15, for example, the threshold value of the number of characters in a message is provided according to the age of the messenger 33, and the template from the message template table 110i is selected according to whether or not a message has the number of characters equal or larger than the threshold value.

For example, in this case, the messenger 33 is a child (age of 5 according to the user attribute information database 110a in FIG. 6). Therefore, the threshold value of the number of characters in the message is determined to be 10 characters or less according to the character amount threshold value table 110j in FIG. 15.

Furthermore, in the situation as illustrated in FIG. 17, the message desired to be conveyed to the recipient 32 is the message of "Mother's favorite singer A will appear on an Internet TV program PPP from 19:30 today", and in a case of asking the messenger 33 to convey the message to the recipient 32, the character amount is 10 characters or more. Therefore, in this case, an output for asking for coming in front of the system is selected as a result of referring to the character amount threshold value table 110j.

When such processing is performed in the information processing unit 12, the template such as "Would you notify that please come here because there is an urgent business" to "(target user)?", which is the template for asking for coming in front of the system, is selected from the message template table 110i.

Figure 24:
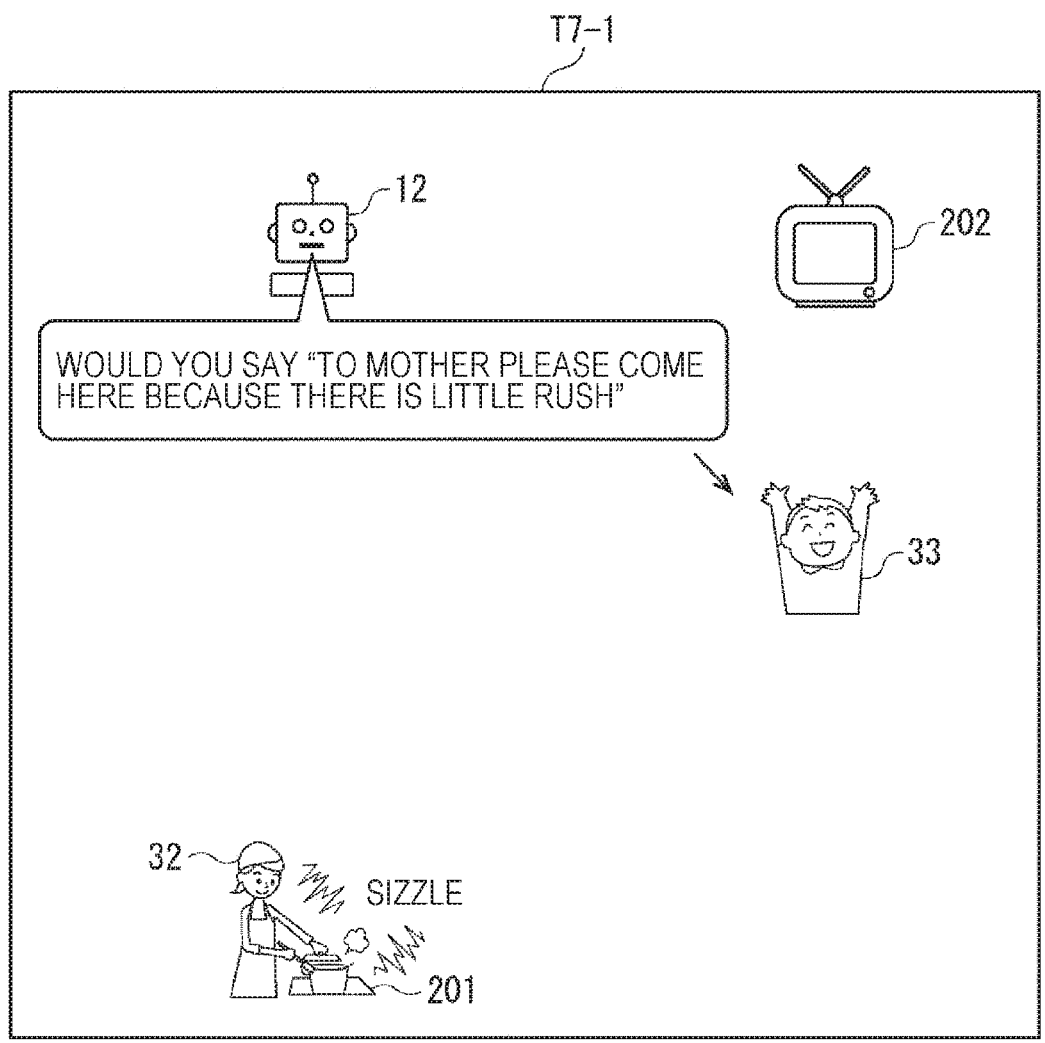
FIG. 24 is a diagram for describing an operation of the information processing unit.

Furthermore, in this case, since the messenger 33 is an infant, the word conversion synonym table 110h (FIG. 13) is referred to and the message is converted into a message for infants. As a result of conversion, as illustrated in FIG. 24, at time T7-1, a message such as "Would you tell your Mother that please come here because there is a little rush" is generated and is output to the messenger 33.

Figure 25:
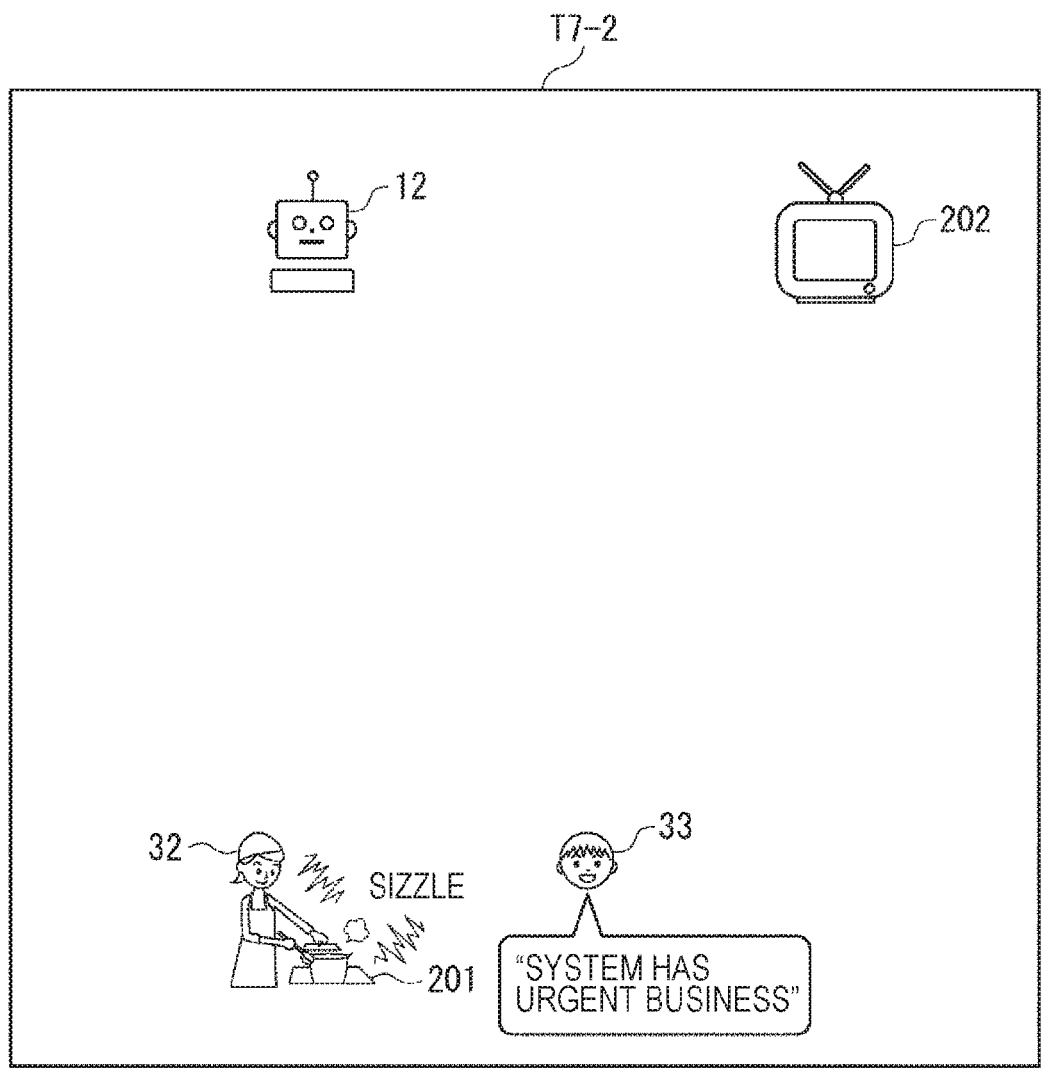
FIG. 25 is a diagram for describing an operation of the information processing unit.

Such a message is output from the information processing unit 12, and the messenger 33 understands the content of the message and starts an action. For example, as illustrated in FIG. 25, at time T7-2, the messenger 33 moves toward the recipient 32 (mother).

Figure 26:
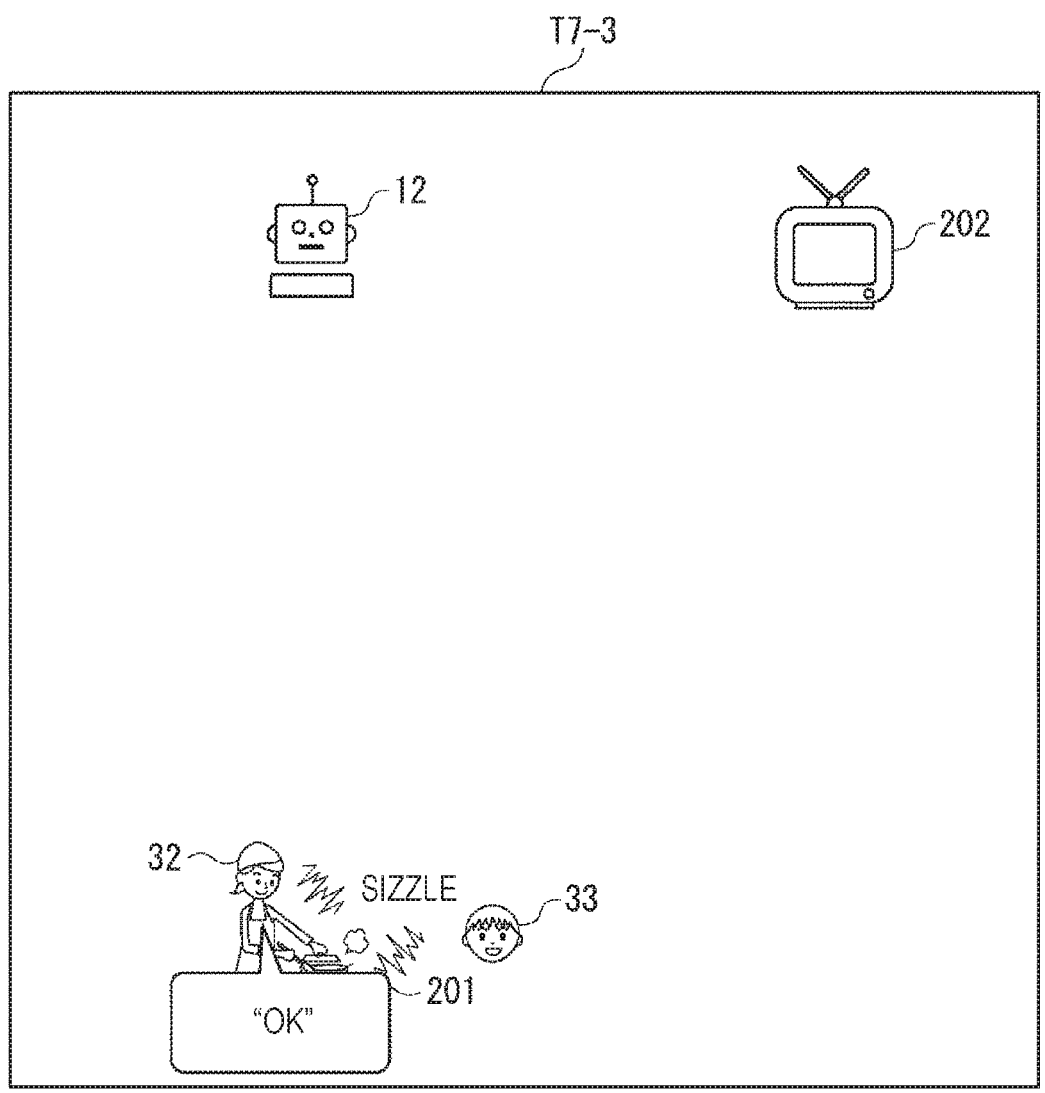
FIG. 26 is a diagram for describing an operation of the information processing unit.

Then, when the messenger 33 approaches the mother, he/she utters (conveys the message) to the mother (recipient 32) that "the system has an urgent business". As a result of the messenger 33 conveying the message from the information processing unit 12 (system) to the recipient 32, the recipient 32 utters "ok" and approaches the system at time T7-3 (FIG. 26).

Figure 27:
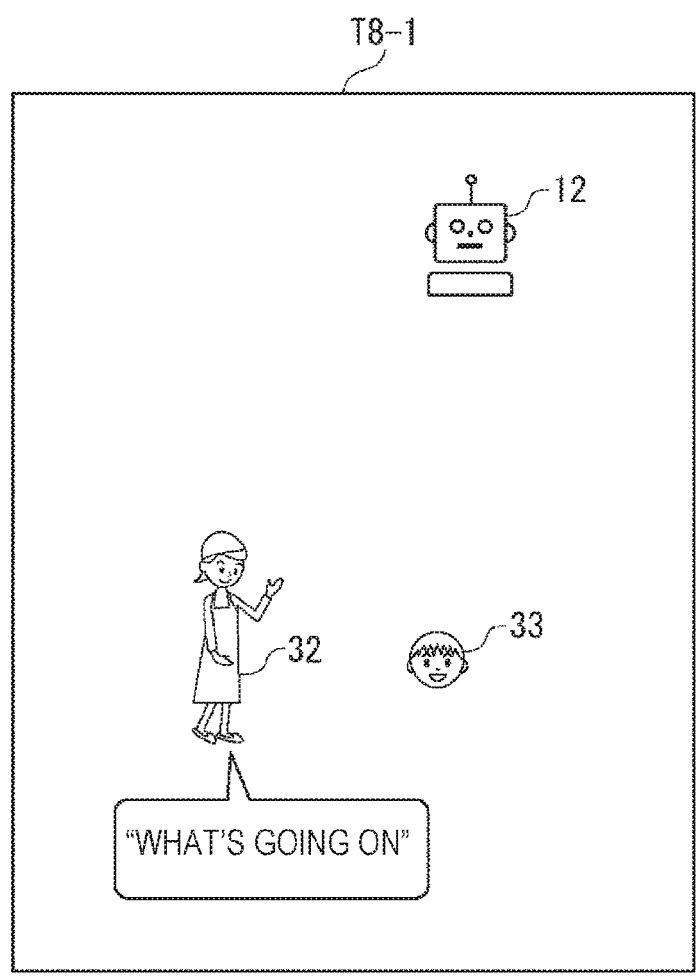
FIG. 27 is a diagram for describing an operation of the information processing unit.

As a result of such an action of the recipient 32, when the recipient 32 approaches the system (the information processing unit 12), the action is detected by the information processing unit 12. As illustrated in FIG. 27, it is assumed that the recipient 32 has approached the information processing unit 12 and has uttered "What's going on?" at time T8-1. At this time, the information processing unit 12 detects the approach and the utterance content of the recipient 32, and updates the detection information database 110b on the basis of the detection result.

Figures 28, 29:
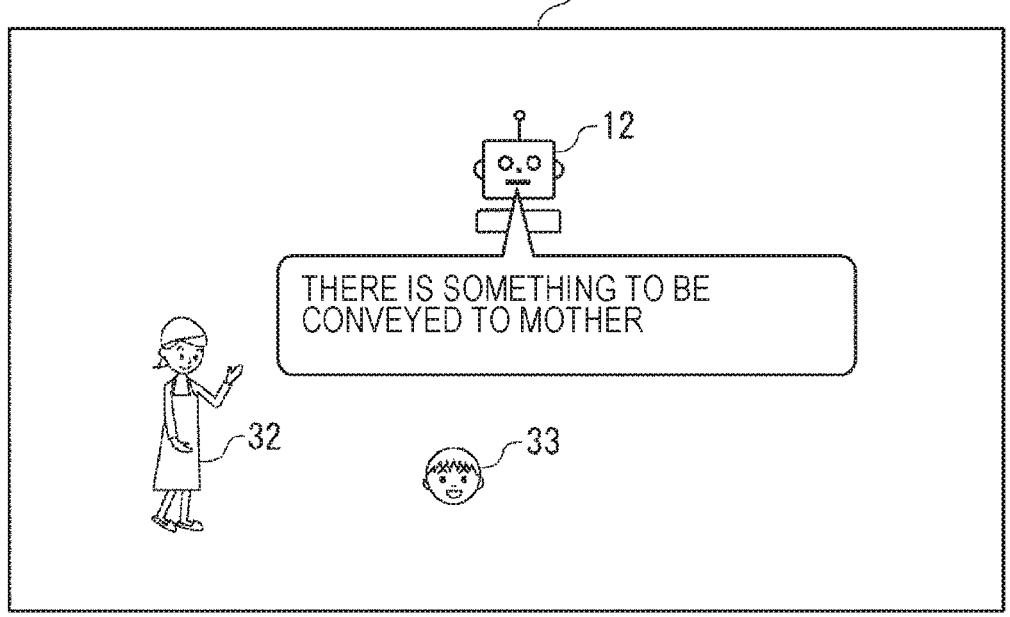
FIG. 28 is a diagram for describing an update of a database.
FIG. 29 is a diagram for describing an operation of the information processing unit.

In this case, as illustrated in FIG. 28, "0.3 m" is written in the column of "distance", "Yes" is written in the column of "face detection", "north" is written in the column of "head direction", "Yes" is written in the column of "gaze detection" in the detection information database 110b. It can be determined that the recipient 32 is located near the information processing unit 12, is facing the information processing unit 12, and is also looking (gazing) at the information processing unit 12 from these detection results.

Furthermore, "40" is written in the column of "volume", "what is going on" is written in the column of "voice recognition result", and "question" is written in the column of "semantic analysis result" in the detection information database 110b. It can be determined that the recipient 32 is talking (is asking a question) to the information processing unit 12 from these detection results.

Moreover, since the action of "raising an arm" has been detected, "raising an arm" is written in the column of "gesture detection" in the detection information database 110b. It can also be determined that the recipient 32 is talking to the information processing unit 12 from the detection result.

In a case where it can be determined that the recipient 32 is focusing on the information processing unit 12 in this way, the information processing unit 12 outputs a message such as "There is something to be conveyed to Mother" to the recipient 32 at time T8-2, as illustrated in FIG. 29.

Figures 30, 31:
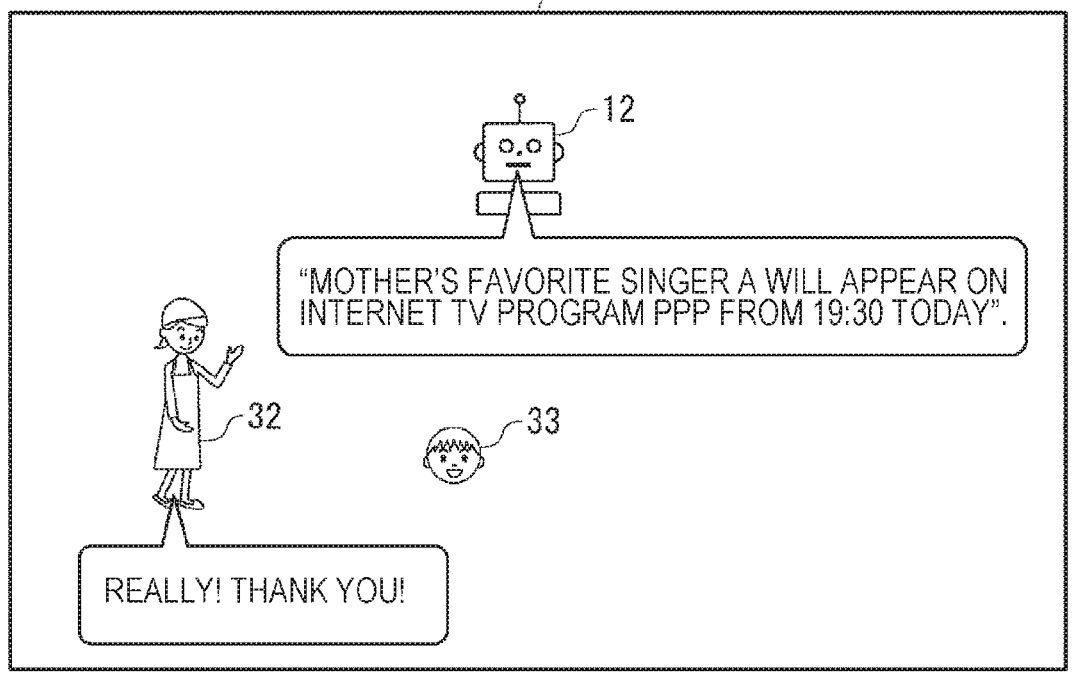
FIG. 30 is a diagram for describing an operation of the information processing unit.
FIG. 31 is a diagram for describing an update of a database.

Then, the message of "Mother's favorite singer A will appear on an Internet TV program PPP from 19:30 today" is output at time T8-3 (FIG. 30). This message is a message desired to be conveyed to the recipient 32 and is a message having not been conveyed to the recipient 32 at the time T1 (FIG. 17).

When the message originally desired to be conveyed is conveyed from the information processing unit 12 to the recipient 32 in this manner, the recipient 32 shows a reaction of uttering words such as "Really. Thank you" in the example illustrated in FIG. 30.

The information processing unit 12 detects this reaction, whereby the information in the detection information database 110b is rewritten as illustrated in FIG. 31. Information such as "really, thank you" is written in the column of "voice recognition result" and information of "appreciation" is written in the column of "semantic analysis result" in the detection information database 110b illustrated in FIG. 31.

When such information is written, the information processing unit 12 can detect that the message has been successively conveyed.

As described above, according to the present technology, in a case where a message has not been able to be conveyed to the recipient 32, the messenger 33 is searched for, and the message desired to be conveyed to the recipient 32 can be finally conveyed to the recipient 32 from the messenger 33.

According to the present technology, a message (information) desired to be conveyed can be more reliably conveyed to a user whom the message is desired to be conveyed to.

<Processing of Information Processing Unit>

Figure 32:
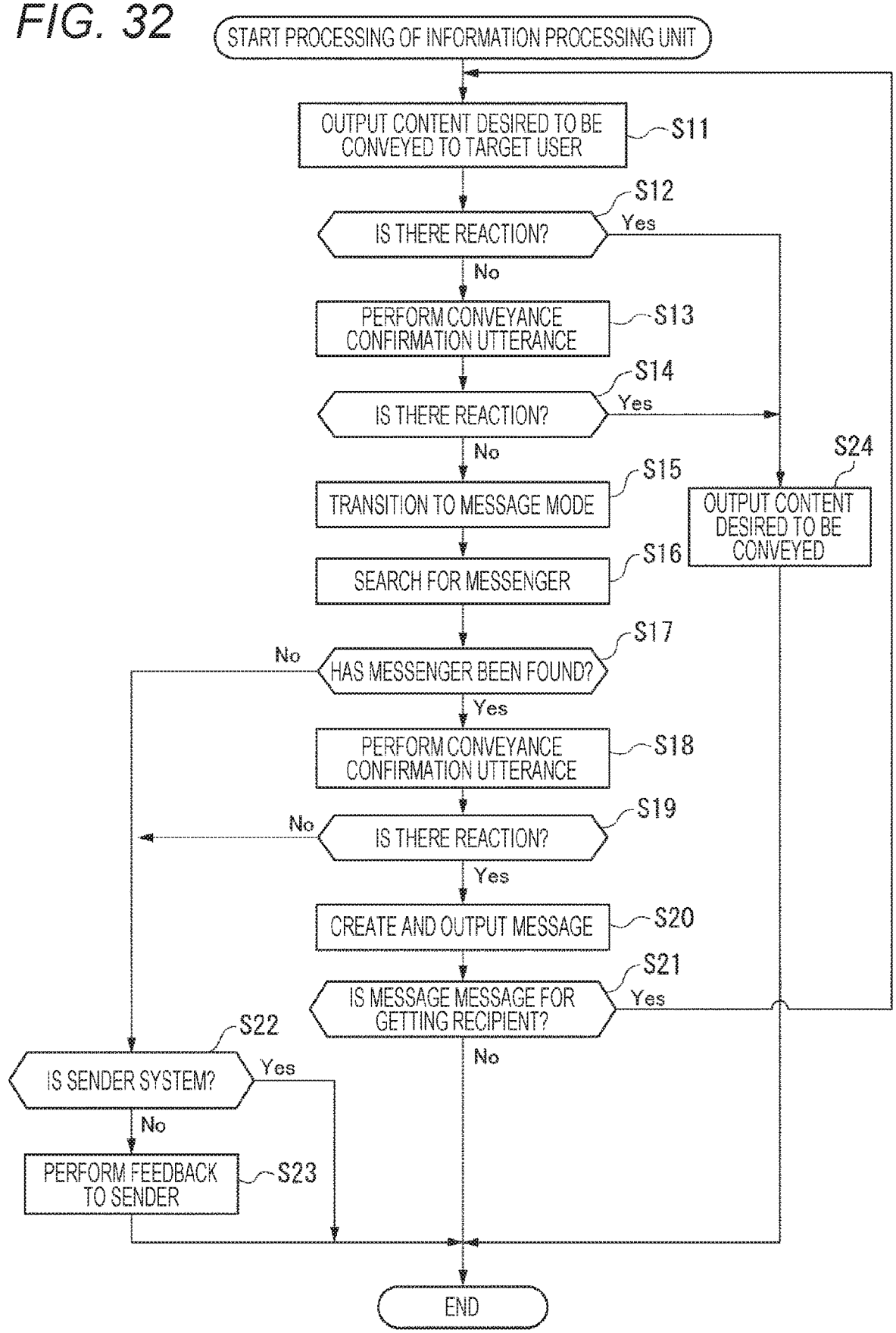
FIG. 32 is a flowchart for describing an operation of the information processing unit.

The above-described processing performed by the information processing unit 12 will be described again with reference to the flowchart illustrated in FIG. 32.

In step S11, content (message) desired to be conveyed is output to a target user. For example, when an email is received from the sender 31 or when information in accordance with preference of the user is acquired from the external service providing unit 21, the content is output to the target user (recipient 32). This processing is processing executed at above-described time T1.

In step S12, whether or not there is a reaction from the target user (recipient 32) is determined. In a case where it is determined that there is a reaction from the target user, the processing proceeds to step S24, the content desired to be conveyed is output, and the processing is terminated.

The processing in step S24 can be omitted because the content desired to be conveyed is output to the target user in step S11. Furthermore, a message for drawing attention from the target user may be output in step S11, and the content desired to be conveyed may be output in step S24. Furthermore, the same message may be output in steps S11 and S24, in other words, the same message may be output twice.

Meanwhile, in a case where it is determined in step S12 that there is no reaction from the target user, the processing proceeds to step S13. In step S13, a conveyance confirmation utterance is performed. This processing is processing executed at above-described time T2.

Whether or not having obtained a reaction from the target user as a result of the conveyance confirmation utterance in step S13 is determined in step S14. In step S14, whether or not there is a reaction from the target user (recipient 32) is determined. In a case where it is determined that there is a reaction from the target user, the processing proceeds to step S24, the content desired to be conveyed is output, and the processing is terminated.

Meanwhile, in a case where it is determined in step S14 that there is no reaction from the target user, the processing proceeds to step S15. In step S15, the processing is moved onto the message mode. The message mode is a mode for searching for the messenger 33 and asking the messenger 33 to convey a message, and is processing executed at the above-described time T3 to T7.

In step S16, a search for the messenger 33 is performed. This processing is processing executed at above-described time T3. As a result of the search, whether or not the messenger 33 has been found is determined in step S17.

In step S17, in a case where it is determined that the messenger 33 has been found, the processing proceeds to step S18. In step S18, a conveyance confirmation utterance is performed for the messenger 33. Then, in step S19, whether or not there is a reaction from the messenger 33 is determined.

In step S19, in a case where it is determined that there is a reaction from the messenger 33, the processing proceeds to step S20. In step S20, a message for requesting the messenger 33 to convey a message is created and is output to the messenger 33. This processing is processing executed at above-described time T6 and T7.

In step S21, whether or not the message is a message for getting the recipient 32 is determined. The message for getting the recipient 32 is a message such as "Would you get "mother"?", for example. Furthermore, a message other than the message for getting the recipient 32 is a message including a message desired to be conveyed to the recipient 32 itself, and is, for example, a message such as "Would you notify that an email informing the father's coming home late has arrived".

In a case where the message is determined not to be the message for getting the recipient 32 in step S21, in other words, in a case where the message asked for conveyance to the messenger 33 is determined to be the message including a message desired to be conveyed to the recipient 32, the message originally desired to be conveyed is conveyed from the messenger 33 to the recipient 32, and thus the processing is terminated.

Meanwhile, in a case where the message is determined to be the message for getting the recipient 32 in step S21, the processing is returned to step S11, and processing in step S11 and subsequent steps is repeated. In other words, in this case, the message is conveyed from the messenger 33 to the recipient 32, and as a result, the recipient 32 comes to the information processing unit 12, and whether or not it becomes a message conveyable state is determined.

Then, when it is determined that it becomes the message conveyable state, the message is conveyed to the recipient 32. This processing is processing executed at above-described time T8.

Meanwhile, in a case where the conveyance confirmation utterance has been performed for the messenger 33 but it is determined in step S19 that the reaction from the messenger 33 has not been obtained, the processing proceeds to step S22. In step S22, whether or not the sender 31 is a system is determined.

As described above, the information desired to be conveyed to the user may be the information regarding the content of an email from the sender 31 (predetermined user) or may be the information obtained by the system (information processing unit 12) from the external service providing unit 21.

In other words, as the information desired to be conveyed to the user, there is a case where the sender 31 is a predetermined user, and information created by the user is desired to be conveyed to the recipient 32, and there is a case where the sender 31 is the system, and information created by the system is desired to be conveyed to the recipient 32.

In a case where the sender 31 is determined to be the system in step S22, the processing is terminated.

Meanwhile, in a case where it is determined in step S22 that the sender 31 is not the system, the processing proceeds to step S23. In step S23, feedback is given to the user who is the sender 31. In this case, it is a state where the sender 31 cannot convey the information to the recipient 32 whom the information desired to be conveyed to and the messenger 33 has not been able to be found. Therefore, processing for notifying the sender 31 that the information has not been conveyed is executed.

For example, the message template table 110i (FIG. 14) is referred to, a feedback template is selected, and feedback is provided to the sender 31. In the case of the example of the template illustrated in FIG. 14, the template such as ""(output info)" has not been able to be conveyed, so would you directly make a contact?" is selected, and for example, a message such as "the email informing coming home late has not been able to be conveyed, so would you directly make a contact?" is created. The message created in this manner is transmitted to the sender 31, as an email, for example.

In this case, the sender 31 is also treated as the messenger 33, and a request for taking an action to enable the recipient 32 to receive the information is output.

When the recipient 32 has not been able to receive the information and when the messenger 33 has not been able to convey the information to the recipient 32, as described above, the feedback is provided to the sender 31, whereby the sender 31 who has transmitted the information becomes able to take an action for enabling the recipient 32 to receive the information.

Therefore, according to the present technology, information can be more reliably conveyed to a user whom the information is desired to be conveyed to corresponding to various states.

Note that, for example, in a case where the information processing unit 12 (system itself) is a portable terminal, for example, a tablet terminal or a smartphone, a message instructing (requesting) the messenger 33 to take the terminal to the recipient 32 may be output to the messenger 33.

In a case where such a message is output, the messenger 33 takes the terminal (system) to the recipient 32 according to the instruction, and the recipient 32 can receive presentation of the information from the brought terminal.

Furthermore, when outputting the message to the messenger 33, in the above-described embodiment, the case of directly outputting the message to the messenger 33 has been described as an example. However, the email may be output to the portable terminal (smartphone or the like) of the messenger 33.

In the case of outputting such an email, a message such as "Take this smartphone to Mother and show this message to her" is output, for example, and the messenger 33 understands such an email and takes an action, whereby the information is presented to the recipient 32.

Furthermore, in the above-described embodiment, after the message is output to the recipient 32 a plurality of times, the processing transitions to the message mode. However, for example, in a case where a predetermined recipient 32 is determined to have a large number of times of transition to the message mode by learning (in a case where the number of times of transition to the message mode exceeds a threshold value), the processing may be started from the message mode, for the predetermined recipient 32.

In other words, the processing may transition to the message mode without outputting the message a plurality of times, and the message may be conveyed by the messenger 33. By doing so, the processing for the recipient 32 to which the information is less easily conveyed can be reduced, and the time to convey the information can be shortened.

Furthermore, in the above-described embodiment, when the processing transitions to the message mode, setting not to transition to the message mode may be able to be made by the user, for example, by the sender 31. For example, there is a case where the sender 31 does not want the messenger 33 to know information depending on the content. In such a case, a mechanism to set the processing not to transition to the message mode may be provided.

<Recording Medium>

The above-described series of processing can be executed by hardware or software. In the case of executing the series of processing by software, a program that configures the software is installed in a computer. Here, the computer includes a computer incorporated in dedicated hardware, and a general-purpose personal computer and the like capable of executing various functions by installing various programs, for example.

Figure 33:
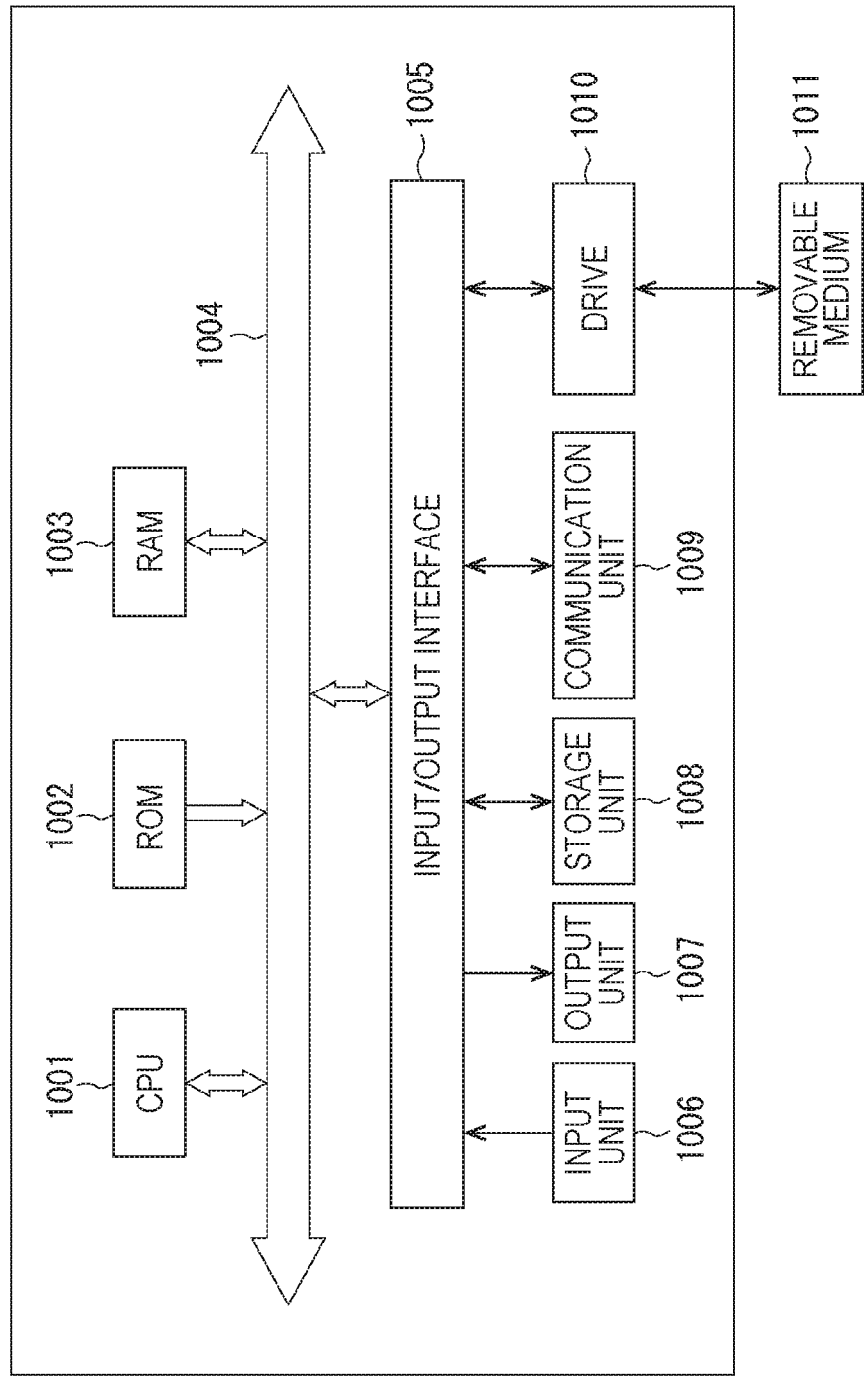
FIG. 33 is a diagram for describing a recording medium.

FIG. 33 is a block diagram illustrating a configuration example of hardware of a computer that executes the above-described series of processing by a program. In a computer, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The storage unit 1008 includes a hard disk, a nonvolatile memory, and the like. The communication unit 1009 includes a network interface, and the like. The drive 1010 drives a removable medium 1011 such as a magnetic disk, an optical disk, a magneto-optical disk, or a semiconductor memory.

In the computer configured as described above, the CPU 1001, for example, loads a program stored in the storage unit 1008 into the RAM 1003 and executes the program via the input/output interface 1005 and the bus 1004, whereby the above-described series of processing is performed.

The program to be executed by the computer (CPU 1001) can be recorded on the removable medium 1011 as a package medium and the like, for example, and provided. Furthermore, the program can be provided via a wired or wireless transmission medium such as a local area network, the Internet, or digital satellite broadcast.

In the computer, the removable medium 1011 is attached to the drive 1010, whereby the program can be installed in the storage unit 1008 via the input/output interface 1005. Furthermore, the program can be received by the communication unit 1009 via a wired or wireless transmission medium and installed in the storage unit 1008. Other than the above method, the program can be installed in the ROM 1002 or the storage unit 1008 in advance.

Note that the program executed by the computer may be a program processed in chronological order according to the order described in the present specification or may be a program executed in parallel or at necessary timing such as when a call is made.

Furthermore, in the present specification, the system refers to an entire apparatus configured by a plurality of apparatuses.

Note that the effects described in the present specification are merely examples and are not limited, and other effects may be exhibited.

Note that embodiments of the present technology are not limited to the above-described embodiments, and various modifications can be made without departing from the gist of the present technology.

Note that the present technology can also have the following configurations.

(1)

An information processing apparatus including:

a presentation unit configured to present information to a first user;

a detection unit configured to detect a reaction indicating that the first user has received the information;

a search unit configured to search for a second user in a case where the detection unit has not been able to detect the reaction; and a request unit configured to request the second user found by the search unit to convey a message to the first user.

(2)

The information processing apparatus according to (1), in which a response promotion message asking for a response is output to the first user in the case where the detection unit has not been able to detect the reaction, and the search unit searches for the second user in the case where the detection unit has not been able to detect the reaction after the response promotion message has been output.

(3)

The information processing apparatus according to (1) or (2), in which the detection unit detects whether or not the second user has made a reaction indicating that the second user has received the request in a case where the request unit has output the request to the second user.

(4)

The information processing apparatus according to (3), in which a response promotion message asking for a response is output to the second user in the case where the detection unit has not been able to detect the reaction.

(5)

The information processing apparatus according to any one of (1) to (4), in which the detection unit detects the reaction by performing at least one of detection of a face of the first user, detection of whether or not nodding is made, detection of a direction of a head, or detection of gaze.

(6)

The information processing apparatus according to any one of (1) to (5), in which the detection unit detects the reaction by performing at least one of detection of a volume of a voice of the first user, detection of a recognition result of the voice, or detection of a result of a semantic analysis of the recognition result.

(7)

The information processing apparatus according to any one of (1) to (6), in which the detection unit detects the reaction by detecting a gesture of the first user and determining whether or not the detected gesture is a reaction indicating that the first user has received the information.

(8)

The information processing apparatus according to any one of (1) to (7), in which the request unit generates and outputs a message according to an age of the second user.

(9)

The information processing apparatus according to any one of (1) to (8), in which the request is a message of wishing to go and get the first user.

(10)

The information processing apparatus according to any one of (1) to (9), in which the request is a message including the information.

(11)

The information processing apparatus according to (10), in which the information included in the message is compressed information.

(12)

The information processing apparatus according to any one of (1) to (11), in which the request is a message notifying a sender of the information that the information has not been able to be presented to the first user.

(13)

An information processing method including:

presenting information to a first user;

detecting a reaction indicating that the first user has received the information;

searching for a second user in a case of having not been able to detect the reaction; and requesting the found second user to convey a message to the first user.

(14)

A program for causing a computer to execute processing including the steps of:
presenting information to a first user;
detecting a reaction indicating that the first user has received the information;
searching for a second user in a case of having not been able to detect the reaction; and
requesting the found second user to convey a message to the first user.

REFERENCE SIGNS LIST

11 Information acquisition unit
12 Information processing unit
101 Voice acquisition unit
102 Voice output unit
103 Voice processing unit
104 Image acquisition unit
105 Display unit
106 Image processing unit
107 Communication unit
108 Operation input unit
109 Control unit
110 Control unit

The invention claimed is:

1. An information processing apparatus, comprising:
a presentation unit configured to present information to a first user;
a detection unit configured to detect a reaction of the first user indicating that the first user has received the information;
a search unit configured to search for a second user when the detection unit has not been able to detect the reaction of the first user; and
a request unit configured to:
select a template of a first message based on a number of characters of the information, wherein
the number of characters of the information is equal to or larger than a specific value corresponding to an age of the second user; and
request the second user to convey the first message to the first user in the selected template.

2. The information processing apparatus according to claim 1, wherein
a response promotion message that asks for a response is output to the first user when the detection unit has not been able to detect the reaction, and
the search unit is further configured to search for the second user when the detection unit has not been able to detect the reaction after the output of the response promotion message.

3. The information processing apparatus according to claim 1, wherein the detection unit is further configured to detect a reaction by the second user, wherein the reaction indicates that the second user has received the request when the request unit has output the request to the second user.

4. The information processing apparatus according to claim 3, wherein a response promotion message that asks for a response is output to the second user when the detection unit has not been able to detect the reaction of the second user.

5. The information processing apparatus according to claim 1, wherein the detection unit is further configured to detect the reaction based on at least one of a face of the first user, a nod by the first user, a direction of a head of the first user, or a gaze of the first user.

6. The information processing apparatus according to claim 1, wherein the detection unit is further configured to detect the reaction based on at least one of a volume of a voice of the first user, a recognition result of the voice, or a result of a semantic analysis of the recognition result.

7. The information processing apparatus according to claim 1, wherein the detection unit is further configured to:
detect the reaction of the first user based on a gesture of the first user; and
determine that the detected gesture is a reaction indicating that the first user has received the information.

8. The information processing apparatus according to claim 1, wherein the request unit is further configured to:
generate the first message based on the age of the second user; and
output the generated first message to the second user.

9. The information processing apparatus according to claim 1, wherein the request is a second message that notifies to go and get the first user.

10. The information processing apparatus according to claim 1, wherein the request is a second message that notifies a sender of the information that the information has not been able to be presented to the first user.

11. An information processing method, comprising:
presenting information to a first user;
detecting a reaction of the first user indicating that the first user has received the information;
searching for a second user when having not been able to detect the reaction;
selecting a template of a first message based on a number of characters of the information, wherein
the number of characters of the information is equal to or larger than a specific value corresponding to an age of the second user; and
requesting the second user to convey the first message to the first user in the selected template.

12. A non-transitory computer-readable medium having stored thereon computer-executable instructions, that when executed by a processor, cause the processor to execute operations, the operations comprising:
presenting information to a first user;
detecting a reaction of the first user indicating that the first user has received the information;
searching for a second user when having not been able to detect the reaction;
selecting a template of a first message based on a number of characters of the information, wherein
the number of characters of the information is equal to or larger than a specific value corresponding to an age of the second user; and
requesting the second user to convey the first message to the first user in the selected template.

13. An information processing apparatus, comprising:
a presentation unit configured to present information to a first user;
a detection unit configured to detect a reaction of the first user indicating that the first user has received the information;
a search unit configured to search for a second user when the detection unit has not been able to detect the reaction of the first user; and a request unit configured to:
 generate a message based on an age of the second user, and
 request the second user to convey the generated message to the first user.

* * * * *